United States Patent
Smith et al.

(10) Patent No.: US 12,350,923 B2
(45) Date of Patent: Jul. 8, 2025

(54) INTERLAYER AND LAMINATE WITH CONTROLLED DEBONDING ZONE TREATMENTS

(71) Applicant: KURARAY EUROPE GMBH, Hattersheim (DE)

(72) Inventors: Charles Anthony Smith, Vienna, WV (US); Stephen John Bennison, Wilmington, DE (US)

(73) Assignee: Kuraray Europe GmbH, Hattersheim (DE)

( * ) Notice: Subject to any disclaimer, the term of this patent is extended or adjusted under 35 U.S.C. 154(b) by 0 days.

(21) Appl. No.: 18/712,302

(22) PCT Filed: Nov. 22, 2022

(86) PCT No.: PCT/US2022/050661
§ 371 (c)(1),
(2) Date: May 22, 2024

(87) PCT Pub. No.: WO2023/096879
PCT Pub. Date: Jun. 1, 2023

(65) Prior Publication Data
US 2025/0018683 A1 Jan. 16, 2025

Related U.S. Application Data

(60) Provisional application No. 63/282,326, filed on Nov. 23, 2021, provisional application No. 63/282,315, filed on Nov. 23, 2021.

(51) Int. Cl.
*B32B 7/12* (2006.01)
*B32B 3/26* (2006.01)
(Continued)

(52) U.S. Cl.
CPC .............. *B32B 7/14* (2013.01); *B32B 3/266* (2013.01); *B32B 7/06* (2013.01);
(Continued)

(58) Field of Classification Search
CPC ......... B32B 7/06; B32B 7/12; B32B 17/1055; B32B 17/10036; B32B 17/10761
See application file for complete search history.

(56) References Cited

U.S. PATENT DOCUMENTS

| 5,547,736 A | 8/1996 | Simon et al. |
| 12,017,443 B2 * | 6/2024 | Smith ............... C09J 7/203 |

(Continued)

FOREIGN PATENT DOCUMENTS

WO WO-2022132417 A1 6/2022

OTHER PUBLICATIONS

International Preliminary Report on Patentability and Written Opinion issued Jun. 6, 2024 in PCT/US2022/050661, 9 pages.
(Continued)

*Primary Examiner* — Elizabeth E Mulvaney
(74) *Attorney, Agent, or Firm* — Element IP, PLC

(57) ABSTRACT

An ionomer-based adhesive polymeric interlayer (API) that provides enhanced properties to rigid substrates through the use of polyvinyl acetal-based controlled debonding zone treatments, and rigid substrate-laminates comprising such interlayers.

13 Claims, 11 Drawing Sheets

(51) Int. Cl.
*B32B 7/06* (2019.01)
*B32B 7/14* (2006.01)
*B32B 17/10* (2006.01)

(52) U.S. Cl.
CPC .. *B32B 17/10036* (2013.01); *B32B 17/10688* (2013.01); *B32B 17/10761* (2013.01); *B32B 17/10935* (2013.01); *B32B 17/10981* (2013.01); *B32B 2250/03* (2013.01); *B32B 2250/40* (2013.01); *B32B 2255/10* (2013.01); *B32B 2260/046* (2013.01); *B32B 2307/412* (2013.01); *B32B 2307/748* (2013.01); *B32B 2315/085* (2013.01); *B32B 2329/06* (2013.01); *B32B 2333/00* (2013.01)

(56) References Cited

U.S. PATENT DOCUMENTS

| | | | | |
|---|---|---|---|---|
| 2008/0286530 | A1* | 11/2008 | Smith | B32B 17/10761 156/99 |
| 2016/0159042 | A1 | 6/2016 | Cui et al. | |
| 2016/0167348 | A1* | 6/2016 | Bennison | B32B 27/08 428/500 |
| 2024/0051272 | A1* | 2/2024 | Smith | B32B 7/027 |

OTHER PUBLICATIONS

International Search Report issued Feb. 27, 2023 in PCT/US2022/050661, 4 pages.
Written Opinion issued Feb. 27, 2023 in PCT/US2022/050661, 7 pages.

\* cited by examiner

INTERLAYER AND LAMINATE WITH CONTROLLED DEBONDING ZONE TREATMENTS

This application claims priority from U.S. Provisional Application Ser. Nos. 63/282,326 and 63/282,315 (both filed 23 Nov. 2021), the disclosures of which are incorporated by reference herein for all purposes as if fully set forth.

FIELD OF THE INVENTION

The present invention relates to ionomer-based adhesive polymeric interlayers (API) that provide enhanced properties to rigid substrates through the use of polyvinyl acetal-based controlled debonding zone treatments, and to rigid substrate-laminates comprising such interlayers.

BACKGROUND OF THE INVENTION

Laminated glass is generally made by laminating two pieces of glass onto a polymeric interlayer. One particular advantage of laminated glass versus solid glass sheets is impact and shatter resistance due to adhesion of the glass to the interlayer sheet.

In safety glass laminates, optimal adhesion of the interlayer to glass is a balance. Too much adhesion detracts from the ability of the laminate to absorb and dissipate energy during an impact event, and too little adhesion can result in optical defects (at the time of lamination and later upon environmental exposure and weathering) and can also detrimentally affect the ability of the interlayer to retain glass shards on impact.

Many publications disclose techniques for adjusting the adhesion between the interlayer and the glass substrate that enables the laminated structure to absorb and dissipate high energy events (e.g., impacts). For example, U.S. Pat. No. 3,607,178 describes washing the glass prior to lamination with water containing calcium and magnesium salts, and U.S. Pat. No. 4,292,372 describes incorporating calcium and/or magnesium carboxylates into the interlayer sheeting to reduce adhesion.

Many different materials have been used as the polymeric interlayer. For example, sheets containing a polyvinyl acetal, also known as polyvinyl butyral, and a plasticizer are widely utilized as an interlayer for laminated glass because they have excellent adhesion-to-glass properties. Laminated glass containing such interlayers can be made with good transparency, mechanical strength, flexibility, acoustic damping, and shatter resistance.

At least partially neutralized ethylene acid copolymers (ionomers) have also been used as interlayers for preparing laminated safety glass, for example, as disclosed in U.S. Pat. Nos. 3,404,134, 3,344,014, 7,445,683, 7,763,360, 7,951,865, 7,960,017, 8,399,097, 8,399,098, US2018/0117883A, US2019/0030863A, US2020/0251082A1, WO2016/076336A1, WO2016/076337A1, WO2016/076338A1, WO2016/076339A1, WO2016/076340A1, WO/2021/237205A1, WO/2022/132417A1 and WO/2022/132418A2.

While ionomer resins can be chosen to produce interlayers having excellent flexural strength and optical properties, the adhesion properties to glass may not be optimal. In particular, because ionomers are generally neutralized acid copolymers, they may develop lamination defects, particularly in high moisture environments.

For example, when using ionomer resins as interlayers for float glass, adhesion is often satisfactory on the "tin side" but not on the "air side" of the glass, so special precautions need to be taken into account during the lamination process to properly orient such glass sheets to ensure contact of the "tin side" to the interlayer.

Other resins can also be used as interlayers or portions of interlayers for float glass, including polyvinyl butyral and thermoplastic elastomers. These, too, can exhibit difficulties with adhesion, laminate toughness, and durability.

Patent references also discuss approaches on enhancing adhesion through the use of primers. For example, U.S. Pat. No. 3,445,423 discloses using a solution of gamma-aminopropyl-triethoxysilane as a primer for bonding the outside marginal portion of a windshield to a metal receiving member using a polyurethane composition.

U.S. Pat. No. 3,881,043 discloses the application of an adhesion primer to the perimeter of a windshield to reduce the tendency for premature delamination. Another embodiment involves the application of the adhesion promoting composition to be applied in a pattern of dots throughout the extent of the interfacial surface to increase the overall magnitude of adhesion.

U.S. Pat. Nos. 5,342,653, 5,478,412 and 5,547,736 disclose a method of applying anti-adhesion projections to the surface of the sheet to counteract the high adhesion of the sheet to glass between the projections. These projections are said to operate on a physical blocking of adhesion means and by preference, do not rely on chemical means.

U.S. Pat. No. 10,022,908 discloses application of a primer to the surface of the interlayer which raises the adhesion between the interlayer and glass surface and can provide increased adhesion retention under exposure to high humidity conditions.

U.S. Pat. No. 3,505,160 discloses the application of an adhesion reducing substance ("a poor adhesive") in the interior portion of a windshield to increase the impact performance in a region where occupant impact could likely occur in an accident scenario.

US2019/0030863A1 discloses that a certain class of silanes can successfully and advantageously be used in very specific amounts and under limited conditions as glass adhesion promoters for sodium-neutralized ionomers, allowing the optimal use of such ionomers in the preparation of interlayers and glass laminates having enhanced interlayer-to-glass adhesion properties.

Most of the prior art involves approaches where the overall adhesion is monotonic across the laminate interface. Additionally, the combination of improved adhesion, laminate toughness, and laminate durability is not disclosed therein.

Surprisingly, it has been shown in WO/2021/237205A1, WO/2022/132417A1 and WO/2022/132418 A2 that interlayer and laminate performance is enhanced by providing a controlled debonding region within the adhesive polymeric interlayer at the interface of the adhesive polymeric interlayer and the glass sheet, which allows for controlled debonding, as exemplified by employing less adhesion-promoting material. Additionally, it has been shown that non-uniform, controlled adhesion produces unique combinations of debonding region-glass adhesion, laminate tear resistance, and laminate post-breakage durability. The enhanced performance is measured by different ways, including ball-on-ring, cyclic weathering, and other tests. The improved adhesion leads to improved durability of the laminates comprising such debonding regions.

Controlled debonding zone treatments (CDZT) have been found to allow further optimization of laminate performance characteristics; primarily laminate tear resistance at a given unit thickness of the debonding region at the interface of the glass and the API within the API compared with conventional art. The durability of laminates can also be optimized to balance aspects of laminate integrity with that of energy absorbing capability under impact or other extreme applied forces acting to breach the laminate.

The CDZT methodology considers the total zone in and around the interfacial contact region between the interlayer and the rigid substrate. This would include the zone/areas which may not receive any direct application of a treatment, i.e., those areas/zones substantially possessing the original properties of the polymeric interlayer and of rigid substrate. The debonding behavior of these areas/zones factor into the design and magnitude of the debonding nature of the treatment area/zones. It is the debonding behavior and interaction of these differing zones that provides the benefits in this subject art.

The CDZT approach involves defining both a range and boundary limits for the energy required to effectuate a debonding "event" at or near the interface between the glass substrate and the polymeric interlayer. These boundary conditions would have at least a lower limit and an upper limit. Each lower and upper limit would be generated through the application of a treatment such that at least a bimodal or multi-modal adhesion level is created, wherein the adhesion/debonding characteristics are defined by a combination of at least the composition of the applied treatment and intertwined with the geometric aspects of the imposed 'pattern'. That is, the CDZT consists of both the "interstitial" space/zones and that of the specific application of "patterned treatment". The CDZT technology has been found to provide superior laminate performance over that of the conventional art. This can be accomplished in various modes and possessing some or all of the characteristics listed herein.

The lower boundary condition should not be one of 'poor adhesion' that is, debonding or delamination that would occur under normal laminate use (typical stresses applied through means such as thermal expansion/contraction, caliper variations in the polymeric interlayer and/or non-planarity and waviness in the rigid substrate, edge pinching of the laminate and the like) and other environmental imposed effects that would affect the long-term durability aspects of the integrity of the laminate (e.g. moisture ingress). It is desired for a laminate to possess an adequate degree of durability and ability to maintain integrity throughout its expected environmental exposure and use.

The upper boundary condition could be set at adhesion/debonding limit where above which there is no measurable influence on the tear-resistance of the interlayer of the laminate. This can either be measured directly through either the ball-on-ring test or ball-drop test or other test which exerts sufficient energy into the laminate causing glass fracture and the resultant possibility of a breach within the polymeric interlayer to occur.

Another means for setting/establishing an upper boundary condition could be performed utilizing the energy value obtained during a peel test at and above which, tearing of the interlayer occurs in more than 50% of the sampling cases. When the debonding energy is so high that polymeric interlayer at around 0.8-mm thickness results infrequent tearing rather than debonding from the rigid substrate, then it can be expected that similar tearing can be expected in the fully laminated condition during an impact or other energetic event of sufficient magnitude to create a tear.

The CDZT technology, while not wanting to be held to theory, in one aspect can be one of a chemical nature, not physical nature. A debonding treatment can consist of the application of a chemically active substance or mixture which can alter the adhesive/debonding characteristics at or near the interface between the rigid substrate and the polymeric interlayer. A treatment can alternatively consist of the application of an energetic "beam", such as electron beam, gamma, plasma, electron discharge, laser, ion-beam or other energetic means such as, plasma, flame-treatment, UV/VIS/IR radiation, microwaves or chemical alteration, via, coating techniques, chemical vapor deposition, and the like. Combinations of a chemical substance(s) with energetic sources can also be employed as a treatment. The treatment may be of an infinitesimally small dimension (i.e., only surface atomic or molecular monolayer affected by the treatment or the treatment may be of a finite thickness (approaching up to 30%) of the API thickness. The treatment may be applied to either the rigid substrate or to the polymeric interlayer or both. The application directly to and as part of the interlayer provides for ease of the manufacturing, for example, roll-to-roll processing and the like.

The CDZT technology can be designed and is most advantageous when the relative positioning of the interlayer to the rigid substrate can be translated and/or rotated in a universal fashion without concerns of alignment of said 'pattern' to substrate edge(s) and with the delamination performance at an edge or planar continuity disruption (hole, cutout, recess, insert, etc.) being demonstrably affected.

The CDZT can optionally include a directionality component to the impending delamination front. The pattern can be produced in a complimentary and preferred geometric orientation such that it provides a more effective bonding relationship against a delamination front than randomly situated. Since, delamination fronts are frequently found to originate and advance from the 'edge' of a given laminate, a pattern can advantageously be constructed so as to best resist the progress of such delamination.

The design of the applied treatment can be defined by various descriptors. The surface coverage (or volume fraction) is one aspect that can be adjusted to achieve a desired effect or outcome. The design can employ the entire design range from a stochastic 'pattern' to a regular, repeatable pattern and all variations in-between. The design elements can vary in proximity to one another. Designs can have an open structure (isolated 'islands') or be of a closed structure (connected pathways of direct or circuitous nature). The applied design can be defined as they relate to either the lower boundary or upper boundary adhesion/debonding aspects of the applied treatment.

The CZDT provides for enhanced laminate performance with respect to the energy level required to breach the laminate and/or the durability of the laminate to withstanding various harsh environmental factors (wide-temperature swings/exposures and high moistures) or imposed stress (flexure, dead or live loads, lamination stress, etc.). Additionally, it can provide improved robustness in performance over a broad range of manufacturing variations, such as rigid substrate composition, substrate surface cleanliness (e.g. glass washing conditions), moisture conditions, improper lamination temperature and dwell time, etc.

The present invention specifically addresses the above-described problems, particularly of ionomer-based interlayers, by providing a means where the integrity of the laminate prepared with the multi-modal bonding robustness of the interlayer/glass laminate assembly is improved while retaining adequate laminate integrity and durability but providing improved impact performance. This is carried out by providing discrete debonding zones at the interface of the ionomer-based adhesive polymeric interlayer and the glass substrate by using in whole or part a polyvinyl acetate-based treatment applied to the ionomer-based interlayer, glass substrate or both.

SUMMARY OF THE INVENTION

In accordance with one aspect of the present invention, there is provided an ionomer-based adhesive polymeric interlayer (API), comprising:
a first and a second API surface;
a sheet of a first polymeric material having a first and a second surface, wherein the first polymeric material is an ionomer (with or without optional additives);
a first treatment in a discreet treatment zone geometry on the first surface of the first polymeric material to create a first treatment-first polymeric material interface, wherein the first treatment is a polyvinyl acetal (with or without optional additives);
a first discrete zone on the first API surface with a maximum mean peel adhesion; and
a second discrete zone on the first API surface with a minimum mean peel adhesion greater than about 0.01 kJ/m$^2$;
wherein the maximum mean peel adhesion is at least about 2 times greater than the minimum mean peel adhesion; and
when the first API surface is laminated to glass to create a glass-API interface, the resulting glass laminate meets one of the following two conditions:

$$G_{T-PI} \leq G_{glass-2D} < G_{1D-glass} \leq G_{0-T} \leq G_{0-PI}, \quad (I)$$

wherein:
$G_{T-PI}$=adhesive strength of the first treatment-first polymeric material interface,
$G_{glass-2D}$=adhesive strength of the glass-second discreet zone interface (for example, one of the first polymeric material or first treatment adheres less to glass than the other),
$G_{1D-glass}$=adhesive strength of the first discrete zone-glass interface (for example, the other of the first polymeric material or first treatment adheres better to glass than the other),
$G_{0-T}$=cohesive strength of the first treatment, and
$G_{0-PI}$=cohesive strength of the first polymeric material.
such that, on debonding of the glass and API, the separation of the glass and API predominantly comprises a mixture of glass-second discreet zone adhesive fracture and first polymeric material-first treatment adhesive fracture;
or $$G_{0-T} \leq G_{glass-PI} < G_{T-PI} \leq G_{T-glass} < G_{0-PI} \quad (II)$$

wherein:
$G_{0-T}$=cohesive strength of the first treatment,
$G_{glass-PI}$=adhesive strength of the glass-first polymeric material interface,
$G_{T-PI}$=adhesive strength of the first treatment-first polymeric material interface,
$G_{T-glass}$=adhesive strength of the first treatment-glass interface, and
$G_{0-PI}$=cohesive strength of the first polymeric material,
such that, on debonding of the glass and API, the separation of the glass and API predominantly comprises a mixture of first treatment cohesive fracture and glass-first polymeric material adhesive fracture.

In one embodiment, one of the first or second discrete zones is distributed in an ordered pattern.

In another embodiment, one of the first or second discreet zones is distributed stochastically.

In another embodiment, the discreet treatment zone geometry is characterized by:
(i) a regular plurality of substantially the same shape,
(ii) a stochastic plurality of substantially the same shape,
(iii) a regular plurality of random shapes,
(iv) a stochastic plurality of random shapes,
(v) a one-dimensional pattern,
(vi) a combination of two or more of (i)-(v), or
(vii) a cluster of one or more of (i)-(vi).

In another embodiment, the weight content of the first treatment as a percentage of the total of the API is in the range of from about 0.00001% to about 30%.

In another embodiment, the zone with maximum mean peel adhesion has a mean peel adhesion that is from about 2 times to about 250 times greater than a mean peel adhesion of the zone with minimum mean peel adhesion.

In another embodiment, at least one of the zones has a mean peel adhesion of from about 0.01 to about 12.0 kJ/m$^2$.

In another embodiment, the ionomer is a partially-neutralized ethylene acid polymer ionomer, or a partially sodium-neutralized ethylene acid polymer ionomer.

In another embodiment, the polyvinyl acetal is a polyvinyl butyral (PVB).

In another embodiment, the first discreet zone is a polyvinyl acetal, and the second discrete zone is an ionomer.

In another embodiment, the first discreet zone is an ionomer and the second discrete zone is a polyvinyl acetal.

In another embodiment, the first treatment has a thickness of from about 0.001 mm to about 10.0 mm.

In another embodiment, each shape of the discreet zone treatment is individually a dot, a circle, a partial circle, an oval, a partial oval, a triangle, a square, a rectangle, a pentagon, a hexagon; a heptagon, or is amorphous.

In another embodiment, an effective diameter of each shape of the discreet zone treatment is in a range of from about 0.1 mm to about 50 mm.

In another embodiment, the peel strength ratio of the zone with maximum peel strength ($Z_{max}$) to the zone with the minimum peel strength ($Z_{min}$), that is, ($Z_{max}/Z_{min}$) is greater than or equal to 5.

In another embodiment, all discrete zones have different peel strength, or one or more discrete zones have the same peel strength, or one or more discrete zones have different peel strength.

In another embodiment, the effective diameter of a regular shaped discrete zone, a random shaped discrete zone, or a cluster discrete zone is from about 1 multiple to about 150,000,000-multiples of the thickness of the discrete zone.

In another embodiment, the adhesive polymeric interlayer comprises from 2 to 100 discreet zones per cm$^2$.

In accordance with another aspect of the present invention, there is provided a glass laminate comprising:
(i) a first glass substrate having a first and second glass surface; and
(ii) an ionomer-based adhesive polymeric interlayer (API) comprising a first and a second API surface;
wherein
the second glass surface is adhered to the first API surface to create a glass/API interface;

the API comprises a first polymeric material having a first and a second surface, wherein the first polymeric material is an ionomer (with or without optional additives);

a first treatment in a discreet treatment zone geometry on one or both of the first surface of the first polymeric material and second surface of the glass substrate, to create a first treatment-first polymeric material interface, wherein the first treatment is a polyvinyl acetal (with or without optional additives);

a first discrete zone at the glass/API interface with a maximum mean peel adhesion; and a second discrete zone at the glass/API interface with a minimum mean peel adhesion greater than about 0.01 kJ/m$^2$;

wherein the maximum mean peel adhesion is at least about 2 times greater than the minimum mean peel adhesion; and the glass laminate meets one of the following two conditions:

$$G_{T-PI} \leq G_{glass-2D} < G_{1D-glass} \leq G_{0-T} \leq G_{0-PI}, \quad (I)$$

wherein:
$G_{T-PI}$=adhesive strength of the first treatment-first polymeric material interface,
$G_{glass-2D}$=adhesive strength of the glass-second discreet zone interface (for example, one of the first polymeric material or first treatment adheres less to glass than the other),
$G_{1D-glass}$=adhesive strength of the first discreet zone-glass interface (for example, the other of the first polymeric material or first treatment adheres better to glass than the other),
$G_{0-T}$=cohesive strength of the first treatment, and
$G_{0-PI}$=cohesive strength of the first polymeric material.

such that, on debonding of the glass and API, the separation of the glass and API predominantly comprises a mixture of glass-second discreet zone adhesive fracture and first polymeric material-first treatment adhesive fracture;

or $$G_{0-T} \leq G_{glass-PI} < G_{T-PI} \leq G_{T-glass} < G_{0-PI} \quad (II)$$

wherein:
$G_{0-T}$=cohesive strength of the first treatment,
$G_{glass-PI}$=adhesive strength of the glass-first polymeric material interface,
$G_{T-PI}$=adhesive strength of the first treatment-first polymeric material interface,
$G_{T-glass}$=adhesive strength of the first treatment-glass interface, and
$G_{0-PI}$=cohesive strength of the first polymeric material, such that, on debonding of the glass and API, the separation of the glass and API predominantly comprises a mixture of first treatment cohesive fracture and glass-first polymeric material adhesive fracture.

In one embodiment, the first treatment is on the first surface of the API. In such case, the API is as set forth above (optionally including all sub-embodiments mentioned herein).

In another embodiment, the first treatment is on the second surface of the glass. In such case, the glass would be pretreated prior to lamination.

In another embodiment, the first treatment is a combination of both treatment on the first surface of the API and on the second surface of the glass. In such case, the API is as set forth above (optionally including all sub-embodiments mentioned herein).

These and other embodiments, features and advantages of the present invention will be more readily understood by those of ordinary skill in the art from a reading of the following detailed description and associated drawings.

BRIEF DESCRIPTION OF THE DRAWINGS

Various embodiments of the present invention are described in detail below with reference to the attached drawing Figures.

DETAILED DESCRIPTION

Figure 1:
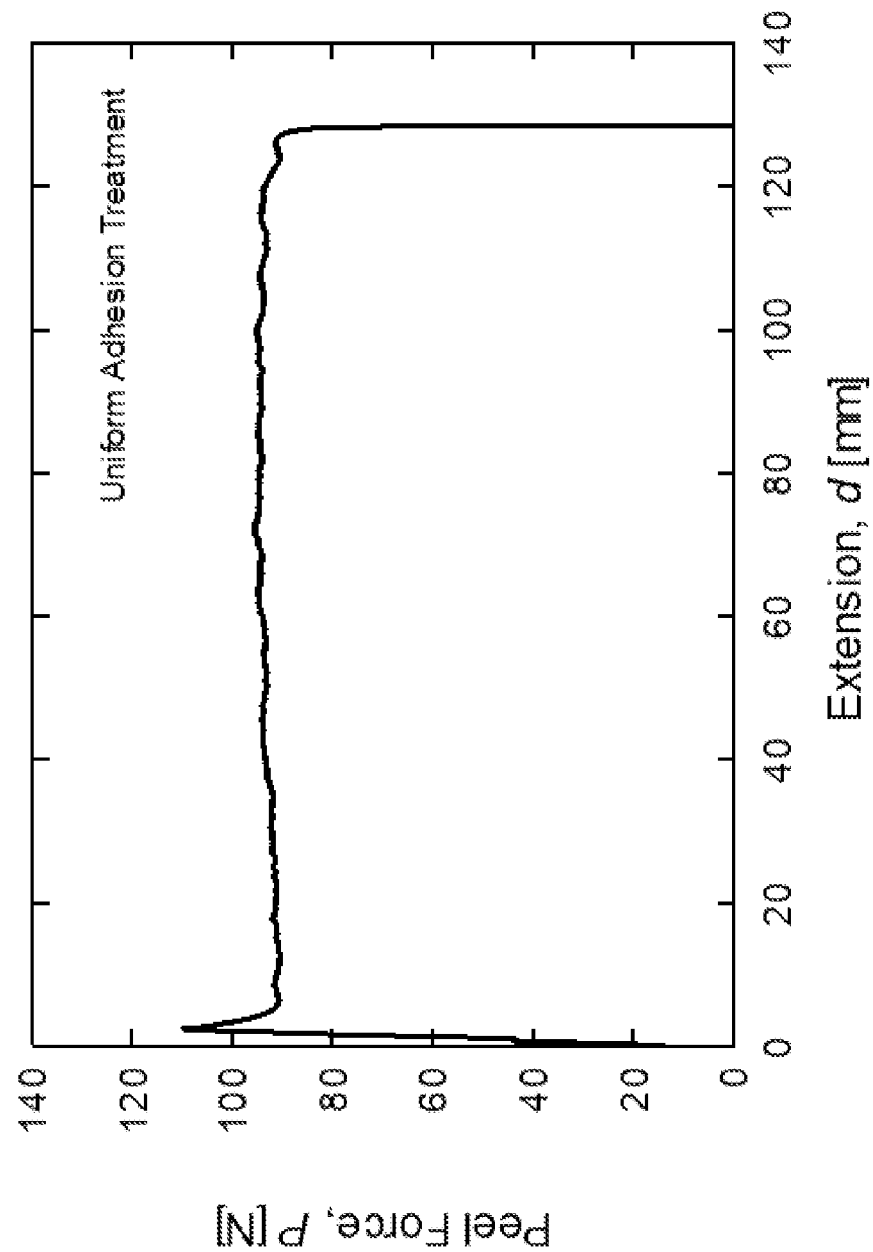
FIG. 1 shows the peel force of a typical interlayer/glass 'laminate' possessing relatively uniform adhesion—this is representative of the conventional art.

The present invention relates to an ionomer-based polymeric interlayer composition, and a glass laminate containing such interlayer. More specifically, the present invention relates to a laminate structure comprising an ionomer-based adhesive polymeric interlayer (API) that comprises discrete zones. Such discrete zones at the interface of the API and the glass substrate, and are on the API, on the glass substrate or a combination thereof. These discrete zones allow for a unique combination of modified API-glass debonding, laminate toughness, and laminate durability. Various spatial patterns and densities of these discrete zones are described, as well as the resulting material properties.

In one embodiment, the adhesive polymeric interlayer (API), on one or both surfaces, comprises two sets of discrete zones, adhesive discrete zones and debonding discrete zones. Each set of discrete zones has at least one discrete zone. In the first set of discrete zones—that is the adhesive zones—a zone exists that has a mean peel adhesion that is the highest amongst all discrete zones on the surface of the API. In the second set of discrete zones—that is the debonding zones—a discrete zone exists that has a mean peel adhesion that is the lowest amongst all discrete zones on the surface of the API. But a condition of the present invention is, the maximum mean peel adhesion of a discrete zone (residing within the set of adhesive discrete zones) is at least about 2 times greater than the minimum mean peel adhesion of a discrete zone (residing within the set of debonding discrete zones).

In one embodiment, some discrete zones are subjected to debonding treatment, and some discrete zones are not subjected to any debonding treatment, the latter demonstrating a higher adhesive tendency than the treated discrete zones. Similarly, and in another embodiment, some discrete zones are subjected to debonding treatment, and some other discrete zones are subjected to a surface treatment that enhances adhesion. Similarly, and in yet another embodiment, some discrete zones are subjected to debonding treatment, some discrete zones are subjected to a surface treatment that enhances adhesion, and some discrete zones are not subjected to any treatment at all. The adhesion-providing discrete zones or the debonding-facilitating discrete zones reside on the same relative spectrum of mean peel strength. The enhanced adhesion zones (and conversely the debonding zones) can be at the ionomer/glass interface, at the treatment/ionomer interface, at the treatment/glass interface, or can be a combination thereof, depending on the embodiment.

In an aspect, the invention provides a polymeric interlayer comprising a controlled debonding treatment which, when combined with one or more layers of glass to form a laminate, provides a combination of improved toughness, adhesion and durability.

In an aspect, the invention provides one or more rigid substrates comprising a controlled debonding treatment which, when combined with one or more layers of a polymeric interlayer to form a laminate, provides a combination of improved toughness, adhesion and durability.

In an aspect, the invention provides a laminate, comprising at least one polymeric interlayer and at least one sheet of glass, wherein a controlled debonding treatment is disposed onto the surface of the polymeric interlayer, the glass, or both, to provide a controlled debonding zone or region, wherein said laminate exhibits a combination of improved toughness, adhesion and durability.

In another aspect, the invention provides a controlled debonding treatment that is substantially uniform and creates discrete debonding zones with variable fracture toughness so that debonding occurs at a prescribed fracture energy level.

In another aspect, the invention provides a controlled debonding treatment that is substantially discrete and creates debonding zones with variable fracture toughness with higher and lower fracture energy.

In yet another aspect, the invention provides a controlled debonding treatment that is substantially discrete and has a substantially uniform pattern; and creates debonding zones with variable fracture toughness with higher and lower fracture energy.

In yet another aspect, the invention provides a controlled debonding treatment that is substantially discrete and has a substantially stochastic pattern; and creates debonding zones with variable fracture toughness with higher and lower fracture energy.

In the context of the present description, all publications, patent applications, patents and other references mentioned herein, if not otherwise indicated, are explicitly incorporated by reference herein in their entirety for all purposes as if fully set forth.

Unless otherwise defined, all technical and scientific terms used herein have the same meaning as commonly understood by one of ordinary skill in the art to which this disclosure belongs. In case of conflict, the present specification, including definitions, will control.

Except where expressly noted, trademarks are shown in upper case.

Unless stated otherwise, all percentages, parts, ratios, etc., are by weight.

Unless stated otherwise, pressures expressed in psi units are gauge, and pressures expressed in kPa units are absolute. Pressure differences, however, are expressed as absolute (for example, pressure 1 is 25 psi higher than pressure 2).

When an amount, concentration, or other value or parameter is given as a range, or a list of upper and lower values, this is to be understood as specifically disclosing all ranges formed from any pair of any upper and lower range limits, regardless of whether ranges are separately disclosed. Where a range of numerical values is recited herein, unless otherwise stated, the range is intended to include the endpoints thereof, and all integers and fractions within the range. It is not intended that the scope of the present disclosure be limited to the specific values recited when defining a range.

When the term "about" is used, it is used to mean a certain effect or result can be obtained within a certain tolerance, and the skilled person knows how to obtain the tolerance. When the term "about" is used in describing a value or an end-point of a range, the disclosure should be understood to include the specific value or end-point referred to.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but can include other elements not expressly listed or inherent to such process, method, article, or apparatus.

The transitional phrase "consisting of" excludes any element, step, or ingredient not specified in the claim, closing the claim to the inclusion of materials other than those recited except for impurities ordinarily associated therewith. When the phrase "consists of" appears in a clause of the body of a claim, rather than immediately following the preamble, it limits only the element set forth in that clause; other elements are not excluded from the claim as a whole.

The transitional phrase "consisting essentially of" limits the scope of a claim to the specified materials or steps and those that do not materially affect the basic and novel characteristic(s) of the claimed invention. A "consisting essentially of" claim occupies a middle ground between closed claims that are written in a "consisting of" format and fully open claims that are drafted in a "comprising" format. Optional additives as defined herein, at a level that is appropriate for such additives, and minor impurities are not excluded from a composition by the term "consisting essentially of".

Further, unless expressly stated to the contrary, "or" and "and/or" refers to an inclusive and not to an exclusive. For example, a condition A or B, or A and/or B, is satisfied by any one of the following: A is true (or present) and B is false (or not present), A is false (or not present) and B is true (or present), and both A and B are true (or present).

The use of "a" or "an" to describe the various elements and components herein is merely for convenience and to give a general sense of the disclosure. This description should be read to include one or at least one and the singular also includes the plural unless it is obvious that it is meant otherwise.

The term "predominant portion" or "predominantly", as used herein, unless otherwise defined herein, means greater than 50% of the referenced material. If not specified, the percent is on a molar basis when reference is made to a molecule (such as hydrogen and ethylene), and otherwise is on a weight basis (such as for additive content).

The term "substantial portion" or "substantially", as used herein, unless otherwise defined, means all or almost all or the vast majority, as would be understood by the person of ordinary skill in the context used. It is intended to take into account some reasonable variance from 100% that would ordinarily occur in industrial-scale or commercial-scale situations.

As used herein, the term "copolymer" refers to polymers comprising copolymerized units resulting from copolymerization of two or more comonomers. In this connection, a copolymer may be described herein with reference to its constituent comonomers or to the amounts of its constituent comonomers, for example "a copolymer comprising ethylene and 15 weight % of acrylic acid", or a similar description. Such a description may be considered informal in that it does not refer to the comonomers as copolymerized units; in that it does not include a conventional nomenclature for the copolymer, for example International Union of Pure and Applied Chemistry (IUPAC) nomenclature; in that it does not use product-by-process terminology; or for another reason. As used herein, however, a description of a copolymer with reference to its constituent comonomers or to the amounts of its constituent comonomers means that the copolymer contains copolymerized units (in the specified amounts when specified) of the specified comonomers. It follows as a corollary that a copolymer is not the product of a reaction mixture containing given comonomers in given amounts, unless expressly stated in limited circumstances to be such.

The term "dipolymer" refers to polymers consisting essentially of two monomers, and the term "terpolymer" refers to polymers comprising at least three monomers.

The term "acid copolymer" as used herein refers to a copolymer comprising copolymerized units of an α-olefin, an α,β-ethylenically unsaturated carboxylic acid, and optionally other suitable comonomer(s) such as, for example, an α,β-ethylenically unsaturated carboxylic acid ester.

The term "(meth)acrylic", as used herein, alone or in combined form, such as "(meth)acrylate", refers to acrylic or methacrylic, for example, "acrylic acid or methacrylic acid", or "alkyl acrylate or alkyl methacrylate".

The term "ionomer" as used herein generally refers to a polymer that comprises ionic groups that are carboxylate salts, for example, ammonium carboxylates, alkali metal carboxylates, alkaline earth carboxylates, transition metal carboxylates and/or combinations of such carboxylates. Such polymers are generally produced by partially or fully neutralizing the carboxylic acid groups of precursor or parent polymers that are acid copolymers, as defined herein, for example by reaction with a base. The alkali metal ionomer as used herein is a sodium ionomer, for example a copolymer of ethylene and methacrylic acid, wherein all or a portion of the carboxylic acid groups of the copolymerized methacrylic acid units are neutralized, and substantially all of the neutralized carboxylic acid groups are in the form of sodium carboxylates.

By "controlled debonding" is meant a zonal variability in the generally planar direction, in adhesion, in the vicinity of the interfacial region between the API and the glass substrate. Stated another way, the adhesion strength of the interface comprising the debonding zones varies generally in the planar direction at the interface of the glass substrate and the API. This variation is described in the multiple exemplary embodiments, infra.

A "controlled debonding zone treatment" is a treatment which alters the debonding fracture energy of the interfacial zone at or near the interface of the rigid substrate and the polymeric interlayer. Energy release rates/work at separation will be reported as kilojoules/m$^2$ for adhesion measurements.

By "discrete zones" is meant that the zones are contained at the surface of the API but are substantially discrete, that is, the zones, which may or may not cover generally the entire area of the adhesive polymeric interlayer (API), in the planar direction, are substantially separate from each other with defined boundaries. The likely random imperfections in discreteness of the zones, given the limitations of the materials, and/or the process of making the materials—for example, two zones that are substantially discrete may "bleed into" each other, de minimis—are acknowledged in the present invention. The discrete zones may have different debonding fracture energy or same debonding fracture energy. The discrete zones may not visually look different but at their discrete boundary, the debonding fracture energy generally changes more than the variance in the fracture energy nominally found on adhesive polymeric interface as would be known in the art.

By "discrete debonding zones" or "debonding zones" is meant that the zones are described as debonding in terms of their mean peel strength. If the glass substrates and the adhesive polymeric interlayer debond, there is substantial likelihood that the debonding is primarily within the "debonding zones."

The description infra discusses discrete zones in terms of their debonding, with the specific examples of controlled debonding zone treatment to engender such debonding zones. Discrete zones, whether subjected to controlled debonding treatment, or not, are situated on the API surface, in various shapes, some providing more adhesion to the glass substrate, and some less. This invention envisions, for example, surface treatment that increases the peel strength of a discrete zone.

By "patterned adhesion" is meant that the debonding treatment is arranged in some geometric fashion with the disposition within the interfacial region of the interlayer and rigid substrate. There is some regularity with a patterned treatment. This treatment will create debonding discontinuities that differ from the interstitial spaces adjoining the pattern. There may be more than one pattern treatment applied, either differing in pattern type, geometry parameters and can be made to be overlapping or imposed upon the underlying pattern treatment or falling within the interstitial space or any combination thereof.

By "stochastic" is meant that an item or pattern is randomly determined and generally cannot be predicted precisely. Therefore, as used herein, a stochastic pattern is a random one.

By "stochastically varying adhesion" is meant that the debonding treatment is approaching a 'random-like' disposition within the interfacial region of the interlayer and rigid substrate. This treatment will create debonding discontinuities from that of a more uniform field of adhesion/debonding.

By "uniform adhesion" is meant that the adhesion/debonding in the interfacial region occurs substantially in a manner that does not vary more than +/−10% from location-to-location as measured on an interfacial area region basis from 5% to 100% of the polymeric interlayer thickness.

By "universal positioning" is meant the adhesion modifier is applied to either the glass or the interlayer or both, in a manner that allows the glass panels to be laid out onto the interlayer without regard to orientation, thus allowing the interlayer to be cut with a minimal amount of waste.

In the present disclosure, the term "glass" is generally used to include silica-based glass as well as other hard substrates commonly used in laminated "glass" applications. For example, polycarbonate and other transparent polymeric substrates are also envisioned in the present invention; however, various types of silica-based glass are preferred.

For convenience, many elements of the present invention are discussed separately, lists of options may be provided and numerical values may be in ranges; however, for the purposes of the present disclosure, that should not be considered as a limitation on the scope of the disclosure or support of the present disclosure for any claim of any combination of any such separate components, list items or ranges. Unless stated otherwise, each and every combination possible with the present disclosure should be considered as explicitly disclosed for all purposes.

Although methods and materials similar or equivalent to those described herein can be used in the practice or testing of the present disclosure, suitable methods and materials are described herein. The materials, methods, and examples herein are thus illustrative only and, except as specifically stated, are not intended to be limiting.

Ionomer—First Polymeric Material

In accordance with the present invention, the ionomer resin is a partially-neutralized ethylene-α,β-unsaturated carboxylic acid copolymer, which includes resins having constituent units derived from ethylene, constituent units derived from an α,β-unsaturated carboxylic acid and optionally other constituent units as described below, in which at least a part of the constituent units derived from the α,β-unsaturated carboxylic acid are neutralized with a cation, preferably a sodium ion.

In the ethylene-α,β-unsaturated carboxylic acid copolymer serving as a base polymer, a content proportion of the constituent units derived from an α,β-unsaturated carboxylic acid is typically 2% by mass or more, or 5% by mass or more (based on total copolymer mass). In addition, the content proportion of the constituent units derived from an α,β-unsaturated carboxylic acid is typically 30% by mass or less (based on total copolymer mass).

Examples of the α,β-unsaturated carboxylic acid constituting the ionomer include, without limitation, acrylic acid, methacrylic acid, itaconic acid, maleic acid, fumaric acid, and mixtures of two or more thereof. In one embodiment, the α,β-ethylenically unsaturated carboxylic acid is selected from acrylic acid, methacrylic acid, and mixtures thereof. In another embodiment, the α,β-ethylenically unsaturated carboxylic acid is methacrylic acid.

The ethylene acid copolymer may further comprise copolymerized units of one or more additional comonomer(s), such as an α,β-ethylenically unsaturated carboxylic acid ester. When present, alkyl esters having 3 to 10, or 3 to 8 carbons, are typically used. Specific examples of suitable esters of unsaturated carboxylic acids include, without limitation, methyl acrylate, methyl methacrylate, ethyl acrylate, ethyl methacrylate, propyl acrylate, propyl methacrylate, isopropyl acrylate, isopropyl methacrylate, n-butyl acrylate, n-butyl methacrylate, isobutyl acrylate, isobutyl methacrylate, tert-butyl acrylate, tert-butyl methacrylate, octyl acrylate, octyl methacrylate, undecyl acrylate, undecyl methacrylate, octadecyl acrylate, octadecyl methacrylate, dodecyl acrylate, dodecyl methacrylate, 2-ethylhexyl acrylate, 2-ethylhexyl methacrylate, isobornyl acrylate, isobornyl methacrylate, lauryl acrylate, lauryl methacrylate, 2-hydroxyethyl acrylate, 2-hydroxyethyl methacrylate, glycidyl acrylate, glycidyl methacrylate, dimethyl maleate, diethyl maleate, dibutyl maleate, dimethyl fumarate, diethyl fumarate, dibutyl fumarate, dimethyl fumarate, vinyl acetate, vinyl propionate, and mixtures of two or more thereof. In one embodiment, the additional comonomers are selected from methyl acrylate, methyl methacrylate, n-butyl acrylate, n-butyl methacrylate, isobutyl acrylate, isobutyl methacrylate, glycidyl methacrylate, vinyl acetate, and mixtures of two or more thereof. In another embodiment, the additional comonomer is one or more of n-butyl acrylate, n-butyl methacrylate, isobutyl acrylate and isobutyl methacrylate. In another embodiment, the additional comonomer is one or both of n-butyl acrylate and isobutyl acrylate.

Suitable ethylene acid copolymers have a melt flow rate (MFR) of from about 1, or from about 2, to about 4000 g/10 min, or to 1000 g/10 min, or to about 400 g/10 min, as determined in accordance with ASTM method D1238-89 at 190° C. and 2.16 kg.

Finally, suitable ethylene acid copolymers may be synthesized as described, for example, in U.S. Pat. Nos. 3,404,134, 5,028,674, 6,500,888, 6,518,365, 8,334,033 and 8,399,096. In one embodiment, a method described in U.S. Pat. No. 8,399,096 is used, and a sufficiently high level and complementary amount of the derivative of the second α,β-ethylenically unsaturated carboxylic acid is present in the reaction mixture.

To obtain the ionomers, the ethylene acid copolymers are partially neutralized by reaction with one or more bases. An example of a suitable procedure for neutralizing the ethylene acid copolymers is described in U.S. Pat. Nos. 3,404,134 and 6,518,365. After neutralization, about 1%, or about 10%, or about 15%, or about 20%, to about 90%, or to about 60%, or to about 55%, or to about 30%, of the hydrogen atoms of carboxylic acid groups present in the ethylene acid copolymer are replaced by other cations. Stated alternatively, about 1%, or about 10%, or about 15%, or about 20%, to about 90%, or to about 60%, or to about 55%, or to about 30%, of the total content of the carboxylic acid groups present in the ethylene acid copolymer are neutralized. In another alternative expression, the acid groups are neutralized to a level of about 1%, or about 10%, or about 15%, or about 20%, to about 90%, or to about 60%, or to about 55%, or to about 30%, based on the total content of carboxylic acid groups present in the ethylene acid copolymers as calculated or measured for the non-neutralized ethylene acid copolymers. The neutralization level can be tailored for the specific end-use.

The counterions to the carboxylate anions in the ionomer are preferably sodium cations. While ionomers used in the present invention are preferably sodium-neutralized ionomers, counterions other than sodium cations may be present. When present in combination with sodium ions, such counterions are present in small amounts of less than 5 equivalent %, or less than 3 equivalent %, or less than 2 equivalent %, or less than 1 equivalent %, based on the total equivalents of carboxylate groups in the ionomer. In one embodiment, the counterions are substantially sodium ions.

Suitable cations other than sodium include any positively charged species that is stable under the conditions in which the ionomer composition is synthesized, processed and used. Suitable cations may be used in combinations of two or more. Typically, such other cations are metal cations, which may be monovalent, divalent, trivalent, or multivalent. Monovalent metal cations include but are not limited to cations of potassium, lithium, silver, mercury, copper, and the like. Divalent metal cations include but are not limited to cations of beryllium, magnesium, calcium, strontium, barium, copper, cadmium, mercury, tin, lead, iron, cobalt, nickel, zinc, and the like. Trivalent metal cations include but are not limited to cations of aluminum, scandium, iron, yttrium, and the like. Multivalent metal cations include but are not limited to cations of titanium, zirconium, hafnium, vanadium, tantalum, tungsten, chromium, cerium, iron, and the like. When the metal cation is multivalent, complexing agents such as stearate, oleate, salicylate, and phenolate radicals may be included, as described in U.S. Pat. No. 3,404,134. Typically, when present, the metal cations used are monovalent or divalent metal cations, such as lithium, magnesium, zinc, potassium, and combinations of one or more of these metal cations.

In one embodiment, counterions other than sodium are present in at most "contaminant" amounts, as one would typically find in industrial situations, as would be recognized by persons of ordinary skill in the relevant art.

The resulting sodium-neutralized ethylene acid copolymer has a melt index, as determined in accordance with ASTM method D1238-89 at 190° C. and 2.16 kg, that is lower than that of the corresponding ethylene acid copolymer. The ionomer's melt index depends on a number of factors, including the melt index of the ethylene acid copolymer, the amount of copolymerized acid, the neutralization level, the identity of the cation and its valency. Moreover, the desired value of the ionomer's melt index may be determined by its intended end use. Typically, however, the ionomer has a melt index of about 1000 g/10 min or less, or about 750 g/10 min or less, or about 500 g/10 min or less, or about 250 g/10 min or less, or about 100 g/10 min or less, or about 50 g/10 min or less, or about 25 g/10 min or less, or about of 20 g/10 min or less, or about 10 g/10 min or less, or about 7.5 g/10 min or less, as determined in accordance with ASTM method D1238-89 at 190° C. and 2.16 kg.

In one embodiment, the ionomer is an at least partially sodium-neutralized ethylene acid dipolymer comprising (consisting essentially of) copolymerized units of:
(i) ethylene, and
(ii) from about 10 wt %, or from about 15 wt %, or from about 18 wt %, or from about 20 wt %, to about 30 wt %, or to about 25 wt %, or to about 23 wt % or to about 22 wt %, of at least one α,β-unsaturated carboxylic acid having 3 to 10 carbon atoms,
wherein the weight percentages of the copolymerized units are based on the total weight of the ethylene acid copolymer and the sum of the weight percentages of the copolymerized units is 100 wt %, and wherein at least a portion of carboxylic acid groups of the α,β-unsaturated carboxylic acid are neutralized to form an ionomer comprising carboxylate groups having sodium counterions.

In one embodiment, the ionomer is an at least partially sodium-neutralized ethylene acid terpolymer comprising copolymerized units of:
(i) ethylene,
(ii) from about 10 wt %, or from about 15 wt %, or from about 18 wt %, or from about 20 wt %, to about 30 wt %, or to about 25 wt %, or to about 23 wt % or to about 22 wt %, of at least one α,β-unsaturated carboxylic acid having 3 to 10 carbon atoms,
(iii) from about 2 wt %, or from about 3 wt %, or from about 4 wt %, or from about 5 wt %, to about 15 wt %, or to about 12 wt %, or to about 11 wt %, or to about 10 wt %, of at least one α,β-unsaturated carboxylic acid ester having 3 to 10 carbon atoms, and
(iv) optionally a derivative of an α,β-unsaturated carboxylic acid other than (iii) in an amount such that (iii)+(iv) is about 15 wt % or less, or about 12 wt % or less, or about 11 wt % or less,
wherein the weight percentages of the copolymerized units are based on the total weight of the ethylene acid copolymer and the sum of the weight percentages of the copolymerized units is 100 wt %, and wherein at least a portion of carboxylic acid groups of the α,β-unsaturated carboxylic acid are neutralized to form an ionomer comprising carboxylate groups having sodium counterions.

Such terpolymer ionomers are generally disclosed in US2017/0320297A1, WO2015/199750A1 and WO2014/100313A1.

In one embodiment of the dipolymer or terpolymer as described above, the α,β-unsaturated carboxylic acid is methacrylic acid.

In one embodiment of the terpolymer as described above, the α,β-unsaturated carboxylic acid ester is n-butyl acrylate, isobutyl acrylate or a mixture thereof.

In one embodiment of the terpolymer described above, the copolymer consists essentially of copolymerized units of (i), (ii) and (iii).

Optional Additives

The ionomer may contains one or more optional additives (in the bulk polymer) that are typical for interlayer applications.

For example, the ionomer may contain a silane for adhesion control, such as disclosed in US2019/0030863A1.

Silanes suitable for use in accordance with the preferred sodium-neutralized ionomer are dialkoxysilanes. In one embodiment, each of the alkoxy groups individually contains from 1 to 3 carbon atoms. Suitable examples include diethoxydimethylsilane, diethoxyl(methyl)vinylsilane, 1,3-diethoxy-1,1,3,3-tertramethyldisiloxane, dimethoxydimethylsilane, dimethoxylmethylvinylsilane, methyldiethoxysilane, diisopropyldimethoxysilane, dicyclopentyldimethoxysilane, γ-aminopropyl-N-cyclohexylmethyldimethoxysilane, 3-aminopropylmethyldimethoxysilane, N-phenyl-3-aminopropylmethyldimethoxysilane, N-phenyl-3-aminopropylmethyldiethoxysilane, N-β-(aminoethyl)-γ-aminopropylmethyldimethoxysilane and 3-glycidoxypropylmethyl diethoxysilane.

In another embodiment, in addition to the alkoxy groups the silane also contains an "active" chemical group for bonding into the ionomer resin matrix, for example, a carboxylic acid-reactive group such as an amino group or a glycidyl group. Suitable examples include γ-aminopropyl-N-cyclohexylmethyldimethoxysilane, 3-aminopropylmethyldimethoxysilane, N-phenyl-3-aminopropylmethyldimethoxysilane, N-phenyl-3-aminopropylmethyldiethoxysilane, N-β-(aminoethyl)-γ-aminopropylmethyldimethoxysilane and 3-glycidoxypropylmethyl diethoxysilane.

Desirably the silane is a liquid under ambient conditions (for example, at 20° C.). Specific such examples include N-β-(aminoethyl)-γ-aminopropylmethyldimethoxysilane (CAS #3069-29-2) and 3-glycidoxypropylmethyldiethoxysilane (CAS #2897-60-1).

In another embodiment, in addition to the alkoxy groups the silane also may contain a less interactive chemical group which can reduce the degree of bonding or adherence into the interlayer resin matrix, for example, a methyl group, phenyl or octadecyl group.

Alternatively or in addition to the use of the silanes, it is also possible to further control the adhesion of the ionomer polymer to glass or the like, if desired.

Although a critical minimum level of adhesion is necessary to maintain sufficient laminate integrity (e.g. preventing delamination defects) and sufficient retention of glass in a post-fractured state, optimization or adjustment of the impact performance of the resulting laminate can be made by intent. Though an optimal addition amount of the adhesion modifier (cumulative) varies with the additive to be used and the resin to be adhesion modified, it is preferably adjusted in such a manner that an adhesive force of the resulting laminate to a glass is generally adjusted to about 3 or more and about 10 or less in a pummel test (described in WO03/033583A1 or the like). In particular, in the case where high penetration resistance is required, the addition amount of the adhesion modifier is more preferably adjusted in such a manner that the adhesive force is about 3 or more and about 6 or less, whereas in the case where high glass shattering preventing properties are required, the addition amount of the adhesion modifier is more preferably adjusted in such a manner that the adhesive force is about 7 or more and about 10 or less.

Other than the aforementioned silanes and other adhesion modifiers, the ionomer may contain one or more other additives including, for example, an antioxidant, an ultraviolet ray absorber, a photostabilizer, an antiblocking agent, a pigment, a dye, a heat shielding material (infrared ray absorber) and the like, or mixtures thereof. Such other additives are in a general sense well known to those of ordinary skill in the relevant art.

Examples of the antioxidant include phenol-based antioxidants, phosphorus-based antioxidants, sulfur-based antioxidants, and the like. Of those, phenol-based antioxidants are preferred, and alkyl-substituted phenol-based antioxidants are especially preferred.

Examples of the phenol-based antioxidant include acrylate-based compounds, such as 2-t-butyl-6-(3-t-butyl-2-hydroxy-5-methylbenzyl)-4-methylphenyl acrylate and 2,4-di-t-amyl-6-(1-(3,5-di-t-amyl-2-hydroxyphenyl)ethyl)phenyl acrylate; alkyl-substituted phenol-based compounds, such as 2,6-di-t-butyl-4-methylphenol, 2,6-di-t-butyl-4-ethylphenol, octadecyl-3-(3,5-di-t-butyl-4-hydroxyphenyl)propionate, 2,2'-methylene-bis(4-methyl-6-t-butylphenol), 4,4'-butylidene-bis(4-methyl-6-t-butylphenol), 4,4'-butylidene-bis(6-t-butyl-m-cresol), 4,4'-thiobis(3-methyl-6-t-butylphenol), bis(3-cyclohexyl-2-hydroxy-5-methylphenyl)methane, 3,9-bis(2-(3-(3-t-butyl-4-hydroxy-5-methylphenyl)propionyloxy)-1,1-dimethylethyl)-2,4,8,10-tetraoxaspiro[5.5]undecane, 1,1,3-trix(2-methyl-4-hydroxy-5-t-butylphenyl)butane, 1,3,5-trimethyl-2,4,6-tris(3,5-di-t-butyl-4-hydroxybenzyl)benzene, tetrakis(methylene-3-(3',5'-di-t-butyl-4'-hydroxyphenyl)propionate)methane and triethylene glycol bis(3-(3-t-butyl-4-hydroxy-5-methylphenyl)propionate); triazine group-containing phenol-based compounds, such as 1,3,5-tris(2,6-dimethyl-3-hydroxy-4-t-butylbenzyl)-1,3,5-triazine-2,4,6(1H,3H,5H)-trione, 6-(4-hydroxy-3,5-di-t-butylanilino)-2,4-bis-octylthio-1,3,5-triazine, 6-(4-hydroxy-3,5-dimethyl anilino)-2,4-bis-octylthio-1,3,5-triazine, 6-(4-hydroxy-3-methyl-5-t-butylanilino)-2,4-bis-octyl thio-1,3,5-triazine and 2-octylthio-4,6-bis-(3,5-di-t-butyl-4-oxyanilino)-1,3,5-triazine; and the like.

Examples of the phosphorus-based antioxidant include monophosphite-based compounds, such as triphenyl phosphite, diphenylisodecyl phosphite, phenyldiisodecyl phosphite, tris(nonylphenyl) phosphite, tris(dinonylphenyl) phosphite, tris(2-t-butyl-4-methylphenyl) phosphite, tris(2,4-di-t-butyl)phosphite, tris(cyclohexylphenyl) phosphite, 2,2-methylenebis(4,6-di-t-butylphenyl)octyl phosphite, 9,10-dihydro-9-oxa-10-phosphaphenanthrene-10-oxide, 10-(3,5-di-t-butyl-4-hydroxybenzyl)-9,10-dihydro-9-oxa-10-phosphaphenanthrene-10-oxide and 10-decyloxy-9,10-dihydro-9-oxa-10-phosphaphenanthrene; diphosphite-based compounds, such as 4,4'-butylidene-bis(3-methyl-6-t-butylphenyl-di-tridecylphosphite), 4,4'-isopropylidene-bis(phenyl-di-alkyl(C12-C15)phosphite), 4,4'-isopropylidene-bis(diphenylmonoalkyl(C12-C15)phosphite), 1,1,3-tris(2-methyl-4-di-tridecylphosphite-5-t-butylphenyl)butane and tetrakis(2,4-di-t-butylphenyl)-4,4'-biphenylene phosphite; and the like. Of those, monophosphite-based compounds are preferred.

Examples of the sulfur-based antioxidant include dilauryl 3,3'-thiodipropionate, distearyl 3,3-thiodipropionate, lauryl stearyl 3,3'-thiodipropionate, pentaerythritol-tetrakis-(3-lauryl-thiopropionate), 3,9-bis(2-dodecylthioethyl)-2,4,8,10-tetraoxaspiro[5.5]undecane, and the like.

These antioxidants can be used solely or in combination of two or more thereof. In the final resin composition, the antioxidant utilized is typically about 0.001 parts by weight or more, or about 0.01 parts by weight or more, based on 100 parts by weight of the ionomer resin. In addition, the amount of antioxidant utilized is typically about 5 parts by weight or less, or about 1 part by weight or less, based on 100 parts by weight of the ionomer resin. Examples of the ultraviolet ray absorber include benzotriazole-based ultraviolet ray absorbers, such as 2-(5-methyl-2-hydroxyphenyl)benzotriazole, 2-[2-hydroxy-3,5-bis(α,α'-dimethylbenzyl)phenyl]-2H-benzotriazole, 2-(3,5-di-t-butyl-2-hydroxyphenyl)benzotriazole, 2-(3-t-butyl-5-methyl-2-hydroxyphenyl)-5-chlorobenzotriazole, 2-(3,5-di-t-butyl-5-methyl-2-hydroxyphenyl)-5-chlorobenzotriazole and 2-(3,5-di-t-amyl-2-hydroxyphenyl)benzotriazole, 2-(2'-hydroxy-5'-t-octylphenyl)triazole; hindered amine-based ultraviolet ray absorbers, such as 2,2,6,6-tetramethyl-4-piperidyl benzoate, bis(2,2,6,6-tetramethyl-4-piperidyl)sebacate, bis(1,2,2,6,6-pentamethyl-4-piperidyl)-2-(3,5-di-t-butyl-4-hydroxybenzyl)-2-n-butylmalonate and 4-(3-(3,5-di-t-butyl-4-hydroxyphenyl)propionyloxy)-1-(2-(3-(3,5-di-t-butyl-4-hydroxyphenyl)propionyloxy)ethyl)-2,2,6,6-tetramethylpiperidine; benzoate-based ultraviolet ray absorbers, such as 2,4-di-t-butylphenyl-3,5-di-t-butyl-4-hydroxybenzoate and hexadecyl-3,5-di-t-butyl-4-hydroxybenzoate; and the like.

These ultraviolet ray absorbers can be used solely or in combination of two or more thereof. In the final resin composition, the amount of ultraviolet ray absorber utilized is typically about 10 ppm by weight or more, or about 100 ppm by weight or more, based on the weight of the ionomer resin. In addition, the amount of ultraviolet ray absorber utilized is typically about 50,000 ppm or less, or about 10,000 ppm or less, based on the weight of the ionomer resin.

In some embodiments, it is also possible to use two or more types of UV absorbers in combination.

In other embodiments, no UV absorber is added, or the ionomer is substantially UV absorber additive free.

Examples of the photostabilizer include hindered amine-based materials, such as "ADEKA STAB LA-57" (a trade name) manufactured by Adeka Corporation, and "TINUVIN 622" (a trade name) manufactured by Ciba Specialty Chemicals Inc.

When a laminated glass is prepared by incorporating a heat-shielding fine particle or a heat-shielding compound as the heat-shielding material into the interlayer of the present invention to give a heat-shielding function to the laminate, a transmittance at a wavelength of 1,500 nm can be regulated to about 50% or less, or the TDS value (calculated from ISO 13837:2008) can be regulated to less than about 43%.

Examples of the heat-shielding fine particle include a metal-doped indium oxide, such as tin-doped indium oxide (ITO), a metal-doped tin oxide, such as antimony-doped tin oxide (ATO), a metal-doped zinc oxide, such as aluminum-doped zinc oxide (AZO), a metal element composite tungsten oxide represented by a general formula: $M_mWO_n$ (M represents a metal element; m is about 0.01 or more and about 1.0 or less; and n is about 2.2 or more and about 3.0 or less), zinc antimonate ($ZnSb_2O_5$), lanthanum hexaboride, and the like. Of those, ITO, ATO, and a metal element composite tungsten oxide are preferred, and a metal element composite tungsten oxide is more preferred. Examples of the metal element represented by M in the metal element composite tungsten oxide include Cs, Tl, Rb, Na, K, and the like, and in particular, Cs is preferred. From the viewpoint of heat shielding properties, m is preferably about 0.2 or more, or about 0.3 or more, and it is preferably about 0.5 or less, or about 0.4 or less.

From the viewpoint of transparency of the ultimate laminate, an average particle diameter of the heat shielding fine particle is preferably about 100 nm or less, or about 50 nm or less. It is to be noted that the average particle diameter of the heat shielding particle as referred to herein means one measured by a laser diffraction instrument.

In the final resin composition, a content of the heat shielding fine particle is preferably about 0.01% by weight or more, or about 0.05% by weight or more, or about 0.1% by weight or more, or about 0.2% by weight or more relative to the weight of the ionomer resin. In addition, the content of the heat shielding fine particle is preferably about 5% by weight or less, or about 3% by weight or less.

Examples of the heat shielding compound include phthalocyanine compounds, naphthalocyanine compounds, and the like. From the viewpoint of further improving the heat shielding properties, it is preferred that the heat shielding compound contains a metal. Examples of the metal include Na, K, Li, Cu, Zn, Fe, Co, Ni, Ru, Rh, Pd, Pt, Mn, Sn, V, Ca, Al, and the like, with Ni being especially preferred.

A content of the heat shielding compound is preferably about 0.001% by weight or more, or about 0.005% by weight or more, or about 0.01% by weight or more, based on the weight of the ionomer resin. In addition, the content of the heat shielding compound is preferably about 1% by weight or less, or about 0.5% by weight or less.

Poly(vinyl)acetal Resin

In accordance with the present invention, a polyvinyl acetal is used as a treatment for the ionomer resins.

Suitable polyvinyl acetal resins and processes for their preparation are in a general sense well known to those of ordinary skill in the relevant art, as exemplified by U.S. Pat. No. 8,329,793B2, US2016/0214354A1, US2016/0214352A1, US2017/0253704A1, US2017/0072665A1 and US2017/0217132A1, and other publications mentioned below. These resins show, for example, acceptable impact strength per end-use standards, acceptable adhesion, low color, low haze, and relatively little change in end-use conditions.

The polyvinylacetal resin can be produced by conventionally known methods of acetalization of polyvinyl alcohol with an aldehyde. The polyvinyl alcohol is produced by hydrolysis of a corresponding polyvinyl acetate.

A viscosity average polymerization degree of polyvinyl alcohol serving as a raw material of the polyvinylacetal resin is typically 100 or more, or 300 or more, or 400 or more, or 600 or more, or 700 or more, or 750 or more, or 900 or more, or 1200 or more. When the viscosity average polymerization degree of polyvinyl alcohol is too low, there is a concern that the penetration resistance or creep resistance properties, particularly creep resistance properties under high-temperature and high-humidity conditions, such as those at 85° C. and at 85% RH, are lowered. In addition, the viscosity average polymerization degree of polyvinyl alcohol is typically 5000 or less, or 3000 or less, or 2500 or less, or 2300 or less, or 2000 or less. When the viscosity average polymerization degree of polyvinyl alcohol is more than 5000, there is a concern that the extrusion of a resin film is difficult.

It is to be noted that since the viscosity average polymerization degree of the polyvinylacetal resin coincides with the viscosity average polymerization degree of polyvinyl alcohol serving as a raw material, the above-described preferred viscosity average polymerization degree of polyvinyl alcohol coincides with the typical viscosity average polymerization degree of the polyvinylacetal resin.

The polyvinylacetal resin is generally constituted of vinyl acetal units, vinyl alcohol units and vinyl acetate units, and these respective units can be, for example, measured by the "Testing Methods for Polyvinyl Butyral" of JIS K 6728, or a nuclear magnetic resonance method (NMR).

Typically, a polyvinylacetal resin is used having a hydroxyl number of from about 12 to about 34, preferably of from about 15 to about 34 (as determined according to ASTM D1396-92).

In the case where the polyvinylacetal resin contains a unit other than the vinyl acetal unit, by measuring a unit quantity of vinyl alcohol and a unit quantity of vinyl acetate and subtracting these both unit quantities from a vinyl acetal unit quantity in the case of not containing a unit other than the vinyl acetal unit, the remaining vinyl acetal unit quantity can be calculated.

The aldehyde which is used for acetalization of polyvinyl alcohol is preferably an aldehyde having 1 or more and 12 or less carbon atoms. When the carbon number of the aldehyde is more than 12, the reactivity of the acetalization is lowered, and moreover, blocking of the resin is liable to be generated during the reaction, and the synthesis of the polyvinyl acetal resin is liable to be accompanied with difficulties.

The aldehyde is not particularly limited, and examples thereof include aliphatic, aromatic, or alicyclic aldehydes, such as formaldehyde, acetaldehyde, propionaldehyde, n-butyl aldehyde, isobutyl aldehyde, valeraldehyde, n-hexyl aldehyde, 2-ethylbutyl aldehyde, n-heptyl aldehyde, n-octyl aldehyde, n-nonyl aldehyde, n-decyl aldehyde, benzaldehyde, cinnamaldehyde, etc. Of those, aliphatic aldehydes having 2 or more and 6 or less carbon atoms are preferred, and above all, butyl aldehyde is especially preferred. In addition, the above-described aldehydes may be used solely or may be used in combination of two or more thereof. Furthermore, a small amount of a polyfunctional aldehyde or an aldehyde having other functional group, or the like may also be used in combination in an amount in the range of 20% by mass or less.

The polyvinylacetal resin is most preferably polyvinyl butyral.

In one embodiment, the polyvinylacetal resin compositions used in the present invention may contain a plasticizer, but is preferably substantially plasticizer free or plasticizer free. Suitable low/free plasticizer thin films are commercially available from Kuraray Europe GmbH under the trade designation "MOWITAL® Thin Film".

Suitable plasticizers when used can be chosen from any that are known or used conventionally in the manufacture of plasticized PVB sheeting compositions. For example, a plasticizer suitable for use herein can be a plasticizer or a mixture of plasticizers selected from the group consisting of: diesters obtained from the chemical reaction of aliphatic diols with carboxylic acids, including diesters of polyether diols or polyether polyols; and, esters obtained from polyvalent carboxylic acids and aliphatic alcohols. For convenience, when describing the sheet compositions of the present invention, a mixture of plasticizers can be referred to herein as "plasticizer". That is, the singular form of the word "plasticizer" as used herein can represent the use of either one plasticizer or the use of a mixture of two or more plasticizers in a given sheet composition. The intended use will be apparent to a reader skilled in the art. Preferred plasticizers for use herein are diesters obtained by the reaction of triethylene glycol or tetraethylene glycol with aliphatic carboxylic acids having from 6 to 10 carbon atoms; and diesters obtained from the reaction of sebacic acid with aliphatic alcohols having from 1 to 18 carbon atoms. More preferably the plasticizer is either tetraethylene glycol di(2-heptanoate) (4G7), triethyleneglycol di-(2-ethyl hexanoate) (3GO), dihexyl adipate (DHA), triethylene glycol di(2-ethylbutyrate (3GH) or dibutyl sebacate (DBS). Most preferably the plasticizer is 3GO.

In one embodiment, the discrete zones are created by an "unplasticized" PVB. Stated another way, a plasticizer is not required in the treatment as applied.

The polyvinyl acetal resins of present invention may include a surfactant. A surfactant suitable for use herein can be any that is known to be useful in the art of polyvinylacetal manufacture. For example, surfactants suitable for use herein include: sodium lauryl sulfate; ammonium lauryl sulfate; sodium dioctyl sulfosuccinate; ammonium perfluorocarboxylates having from 6 to 12 carbon atoms; sodium aryl sulfonates, adducts of chlorinated cyclopentadiene and maleic anhydride; partially neutralized polymethacrylic acid; alkylaryl sulfonates; sodium N-oleyl-N-methyl laurate; sodium alkylaryl polyether sulfonates; triethanolamine lauryl sulfate; diethyl dicyclohexyl ammonium lauryl sulfate; sodium secondary-alkyl sulfates; sulfated fatty acid esters; sulfated aryl alcohols; and the like. Preferable surfactants include sodium lauryl sulfate, sodium dioctyl sulfosuccinate, sodium cocomethyl tauride, and decyl(sulfophenoxy) benzenesulfonic acid disodium salt. It has been found that sodium dodecyl sulfate (SDS) and sodium lauryl sulfate (SLS) are particularly useful.

The surfactant can be included in any effective amount for the particular set of process conditions practiced. The surfactant can be included in an amount of from about 0.01, or from about 0.10, or from about 0.15, to about 0.85, or to about 0.80, or to about 0.75, or to about 0.70, pph by weight, based on the weight of poly vinylacetate resin ultimately used to prepare the polyvinylacetal.

In addition, it is also possible to control the adhesion of the polyvinyl acetal treatment to the ionomer and/or glass, if desired, through the addition of one or more adhesion modifiers. Typical adhesion modifiers include, for example, those disclosed in WO03/033583A1. Alkali metal salts and alkaline earth metal salts are typically used, for example, salts of potassium, sodium, magnesium, and the like. Examples of the salt include salts of organic acids, such as octanoic acid, hexanoic acid, butyric acid, acetic acid and formic acid; inorganic acids, such as hydrochloric acid and nitric acid; and the like. Magnesium compounds are preferred.

Sheets/Interlayers

Sheets of the ionomer can be prepared by conventional melt extrusion or melt molding processes suitable for making interlayers for glass laminates. Such processes are well-known to those of ordinary skill in the relevant art, as exemplified by the previously incorporated publications.

The sheets can be monolayer or multilayer sheets. For example, multilayer sheets can be formed having a functional core layer sandwiched between two exterior layers and other optional interior layers. In one embodiment, at least one (or both) of the exterior layers of the multilayer interlayer is a sheet of the resin composition in accordance with the present invention.

As one example of a functional core layer can be mentioned an acoustic damping layer, such as a polystyrene copolymer intermediate film (see JP2007-91491A), a polyvinyl acetal layer (see US2013/0183507, U.S. Pat. No. 8,741,439, JP2012-214305A and U.S. Pat. No. 8,883,317), a viscoelastic acrylic layer (see U.S. Pat. No. 7,121,380), a layer containing a copolymer of styrene and a rubber-based resin monomer (see JP2009-256128A), a layer containing a polyolefin (see US2012/0204940), a layer containing an ethylene/vinyl acetate polymer (see WO2015/013242A1), a layer containing an ethylene acid copolymer (see WO2015/085165A1).

In one specific embodiment, the intermediate layer if used is a thermoplastic elastomer resin, such as disclosed in US2017/0320297A1, WO2016/076336A1, WO2016/076337A1, WO2016/076338A1 WO2016/076339A1 and WO2016/076340A1.

Further, the interlayer as a whole can be symmetric having a substantially consistent thickness, or can be asymmetric wherein a portion of the interlayer has a thickness greater than another portion (for example, partial or full "wedge", and/or can be substantially clear or having coloring in all or a portion (for example, "shadeband"), as discussed in US2017/0320297A1 and US2018/0117883A1.

In an asymmetric construction such as a wedge, the thinner portion of the interlayer should possess the thicknesses of a symmetric construction, while the thickness of the thick portion will depend on various parameters such as wedge angle. In one embodiment of a wedge-shaped interlayer, the thicker edge has a thickness of about 1850 μm or less, or about 1600 μm or less, or about 1520 μm or less, or about 1330 μm or less, or about 1140 μm or less; and the thinner edge has a thickness of about 600 μm or more, or about 700 μm or more, or about 760 μm or more.

In addition, a concave and convex structure, such as an embossing, can be formed on the surface of the interlayer of the present invention by conventionally known methods for assistance in deairing in laminate production. The shape of the embossing is not particularly limited, and those which are conventionally known can be adopted.

In one embodiment, at least one surface (and preferably both surfaces) of the interlayer for a laminated glass is shaped. By shaping at least one surface of the interlayer for a laminated glass, in the case where a laminated glass is produced, an air bubble present at an interface between the interlayer for a laminated glass and a glass easily escapes to the outside of the laminated glass, and thus, the appearance of the laminated glass can be made favorable. It is preferred to shape at least one surface of the interlayer for a laminated glass by an embossing roll method. By shaping the surface of the interlayer for a laminated glass, a concave portion and/or a convex portion are/is formed on the surface of the interlayer for a laminated glass.

An embossing roll to be used in the embossing roll method can be produced, for example, by using an engraving mill (mother mill) having a desired concave-convex pattern and transferring the concave-convex pattern to the surface of a metal roll. Further, an embossing roll can also be produced using laser etching. Further, after forming a fine concave-convex pattern on the surface of a metal roll as described above, the surface with the fine concave-convex pattern is subjected to a blast treatment using an abrasive material such as aluminum oxide, silicon oxide, or glass beads, whereby a finer concave-convex pattern can also be formed.

Further, the embossing roll to be used in the embossing roll method is preferably subjected to a release treatment. In the case where an embossing roll which is not subjected to a release treatment is used, it becomes difficult to release the interlayer for a laminated glass from the embossing roll. Examples of a method for the release treatment include known methods such as a silicone treatment, a Teflon (registered trademark) treatment, and a plasma treatment.

The depth of the concave portion and/or the height of the convex portion (hereinafter sometimes referred to as "the height of the embossed portion") of the surface of the interlayer for a laminated glass shaped by an embossing roll method or the like are/is typically about 5 μm or more, or about 10 μm or more, or about 20 μm or more. The height of the embossed portion is typically about 150 μm or less, or about 100 μm or less, or about 80 μm or less.

In the invention, the height of the embossed portion refers to a maximum height roughness (Rz) defined in JIS B 0601 (2001). The height of the embossed portion can be measured by, for example, utilizing the confocal principle of a laser microscope or the like. Incidentally, the height of the embossed portion, that is, the depth of the concave portion or the height of the convex portion may vary within a range that does not depart from the gist of the invention.

Examples of the form of the shape imparted by an embossing roll method or the like include a lattice, an oblique lattice, an oblique ellipse, an ellipse, an oblique groove, and a groove. The inclination angle of such form is typically from about 100 to about 80° with respect to the film flow direction (MD direction). Further, the shaping pattern may be a regular pattern or an irregular pattern such as a random matte pattern, or a pattern such as disclosed in U.S. Pat. No. 7,351,468. The shaping by an embossing roll method or the like may be performed on one surface of the interlayer for a laminated glass, or may be performed on both surfaces, but is more typically performed on both surfaces.

Laminates

It is possible to produce laminates of the present invention by conventionally known methods. Examples thereof include using a vacuum laminator, using a vacuum bag, using a vacuum ring, using a nip roll, and the like. In addition, a method can be used in which, after temporary contact bonding, the resultant laminate is put into an autoclave for final bonding. Further description of these methods can be found in, for example, U.S. Pat. No. 7,642,307.

In the case of using a vacuum laminator, for example, a known instrument which is used for production of a solar cell can be used, and the assembly is laminated under a reduced pressure of about $1 \times 10^{-6}$ MPa or more and about $3 \times 10^{-2}$ MPa or less at a temperature of about 100° C. or higher, or about 130° C. or higher, and about 200° C. or lower, or about 170° C. or lower. The method of using a vacuum bag or a vacuum ring is, for example, described in EP1235683A1 (CA2388107A1) and, for example, the assembly is laminated under a pressure of about $2 \times 10^{-2}$ MPa at about 130° C. or higher and about 145° C. or lower.

In the case of using a nip roll, for example, there is exemplified a method in which after conducting first temporary contact bonding at a temperature of a flow starting temperature of the skin resin or lower, temporary contact bonding is further conducted under a condition close to the flow starting temperature. Specifically, for example, there is exemplified a method in which the assembly is heated at about 30° C. or higher and about 100° C. or lower by an infrared heater or the like, then de-aerated by a roll, and further heated at about 50° C. or higher and about 150° C. or lower, followed by conducting contact bonding by a roll to achieve bonding or temporary bonding.

Though the autoclave process which is supplementarily conducted after the temporary contact bonding is variable depending upon the thickness or constitution of a module, it is, for example, carried out under a pressure of about 1 MPa or more and about 15 MPa or less at a temperature of about 120° C. or higher and about 160° C. or lower for about 0.5 hours or more and about 2 hours or less.

Well-known "no-autoclave" processes may alternatively be used to process laminates.

Advantageously, the glass to be used for preparing a laminated glass is not particularly limited. Inorganic glasses, such as a float sheet glass, a polished sheet glass, a figured glass, a wired sheet glass, a heat-ray absorbing glass, and conventionally known organic glasses, such as polymethyl methacrylate and polycarbonate, and the like can be used. These glasses may be any of colorless, colored, transparent, or non-transparent glasses. These glasses may be used solely, or may be used in combination of two or more thereof.

The laminated glass of the present invention can be suitably used for a windshield for automobile, a side glass for automobile, a sunroof for automobile, a rear glass for automobile, or a glass for head-up display; a building member for a window, a wall, a roof, a sunroof, a sound insulating wall, a display window, a balcony, a handrail wall, or the like; a partition glass member of a conference room;

a solar panel; and the like. Further information on such uses can be found by reference to the previously incorporated publications.

In one embodiment, this invention relates to a laminate structure comprising a stack of at least one glass substrate adhered to an adhesive polymeric interlayer. The interfacial region or zone of the adhesive polymeric interlayer (API) and glass interface comprises discrete zones.

As discussed previously, the discrete zones are substantially discrete, that is, the zones, which may or may not cover generally the entire area of the adhesive polymeric interlayer (API) surface, in the planar direction, are substantially separate from each other with defined boundaries. The likely random imperfections in discreteness of the zones given the limitations of the materials, and/or the process of making the materials—for example, two zones that are substantially discrete may "bleed into" each other, de minimis—are acknowledged in the present invention. The discrete zones in a given plane may be co-planar to at least one of the glass substrate, or to the API layer.

In one embodiment, the laminate structure can comprise more than one glass substrate and corresponding polymeric interlayers in between. For example, the number of glass substrates can be 1, 2, 3, . . . 18, 19, and 20.

Embodiments described below use a two-glass substrate with one API layer, but only as an example. It is understood that the description applies to multiple glass substrates with corresponding multiple API layers.

In one embodiment, the laminated structure of the present invention comprises more than one discrete debonding zones.

In one embodiment, this invention relates to an adhesive polymeric interlayer (API), wherein one of the first or second discrete zones comprises the first polymeric material, and the other of the first and second discrete zones comprises the polyvinyl acetal.

In another aspect, the invention provides debonding region with a controlled debonding treatment that is substantially discrete and creates debonding zones with variable fracture toughness with higher and lower fracture energy.

Controlled Debonding Zones Characteristics
Peel Adhesion Difference Between Discrete Debonding Zones In an embodiment of the invention, the polymeric interlayer comprises more than one discrete zone or a controlled debonding zone, alternatively called debonding zone, such that the difference in mean peel adhesion between the zone with minimum peel adhesion ($Z_{min}$) and the zone with maximum peel adhesion ($Z_{max}$) is at least about 2 multiples. Stated differently, $(Z_{max}/Z_{min}) \geq 2$. In an embodiment of the invention, a laminate comprises an interlayer with multiple debonding zones on the surface of the API, such that the difference in peel strength or mean peel adhesion between any two zones $Z_1$ and $Z_2$ is greater than or equal to 0, or, their ratio is greater than or equal to 1. In other words, $Z_1 - Z_2 \geq 0$, or $Z_1/Z_2 \geq 1$. However, in this embodiment, the $(Z_{max}/Z_{min}) \geq 2$ condition is maintained.

In one embodiment, the peel strength ratio of the zone with maximum peel strength ($Z_{max}$) to the zone with the minimum peel strength ($Z_{min}$), that is, ($Z_{max}/Z_{min}$) is greater than or equal to 5. In one embodiment, all zones have different peel strengths; one or more zones have the same peel strength; or one or more zones have different peel strengths.

To elaborate further, this invention encompasses the embodiment, wherein more than one zones discrete from each other demonstrate different peel strength, but the ($Z_{max}/Z_{min}$) $\geq 2$ condition is maintained. For example, in a laminate with four zones in the interlayer at the interface, $Z_1$, $Z_2$, $Z_3$, and $Z_4$, $Z_1$ is the zone with maximum peel strength and $Z_3$ is the zone with minimum peel strength. Zones $Z_1$, $Z_2$, $Z_3$, and $Z_4$ have different peel strengths. In an equation form:

$$(Z_1/Z_3) \geq 2; \text{ and}$$

$$Z_1 \neq Z_2 \neq Z_3 \neq Z_4.$$

In an embodiment of the invention, the interlayer comprises more than one zones at the interface discrete from each other demonstrate the same peel strength, or different peel strength, but the ($Z_{max}/Z_{min}$)$\geq 2$ condition is maintained. For example, in a laminate with ten zones in the interlayer, $Z_1$, $Z_2$, $Z_3$, $Z_4$, $Z_5$, $Z_6$, $Z_7$, $Z_8$, $Z_9$, and $Z_{10}$, $Z_4$ is the zone with maximum peel strength and $Z_8$ is the zone with minimum peel strength. Zones $Z_2$, $Z_6$, and $Z_9$ have the same peel strength. Zones $Z_1$, $Z_2$, and $Z_7$ have different peel strengths. In an equation form:

$$Z_2 = Z_6 = Z_9;$$

$$(Z_4/Z_8) \geq 2; \text{ and}$$

$$Z_1 \neq Z_2 \neq Z_7.$$

In one embodiment, $Z_{max}$ is the mean peel strength of the untreated API surface comprising discrete zones. In other words, for example in a leopard-spots type of arrangement of the discrete zones, the dark spots are the discrete zones treated by controlled debonding zone treatment, and the inter-zone space on the API surface that is untreated has a mean peel strength of $Z_{max}$. In another embodiment, $Z_{min}$ is the mean peel strength of the API surface that has been treated with controlled debonding zone treatment. And interspersed on the treated API surface are provided discrete zones that have a discrete zone that corresponds to $Z_{max}$ mean peel strength. In other words, a spectrum of discrete zones exists on the API surface, some treated, some untreated, the ratio of two zones ($Z_{max}/Z_{min}$)$\geq 2$. In between the discrete zones with a $Z_{min}$ and a $Z_{max}$ mean peel strengths exist all other discrete zones comprising various mean peel strength numbers that are same or not same, and that which are treated or not treated for debonding.

Shape Difference Between Controlled Debonding Discrete Zones

In one embodiment, the polymeric interlayer comprises more than one discrete zone, such that the discrete (debonding) zones have regular shapes. The debonding zone is defined according to the peel adhesion strength. Stated another way, to a normal eye an interlayer may appear homogeneous and uniform, but for the purposes of the present invention, the debonding zones are defined by the difference in their peel strengths.

Figure 4:
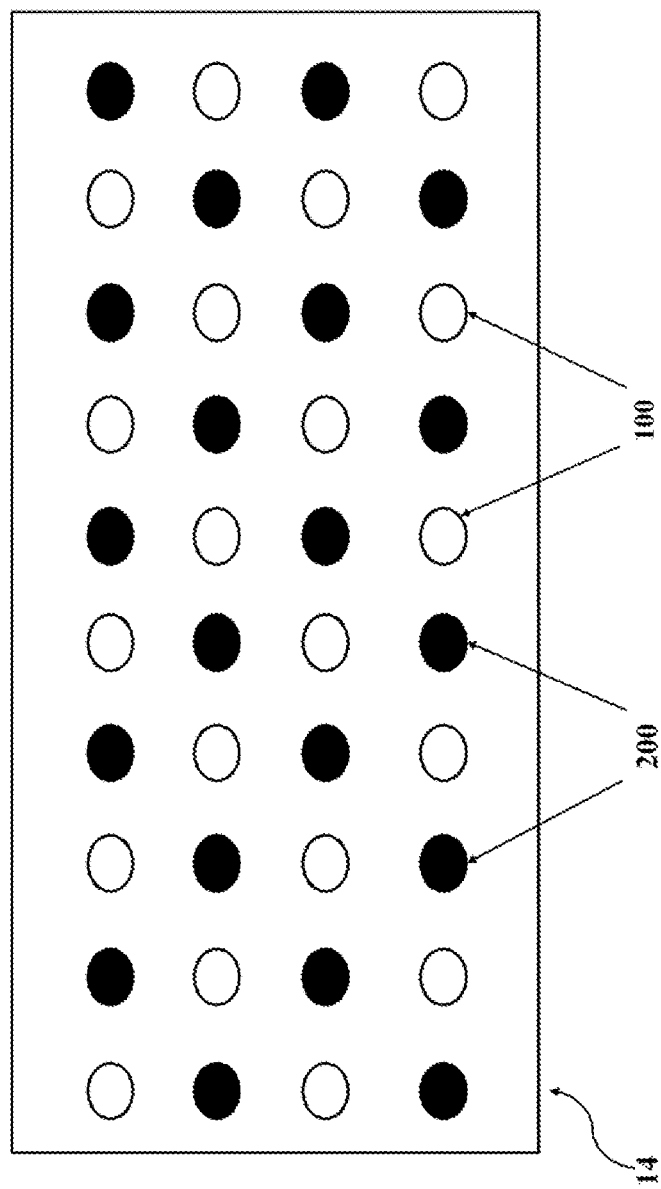
FIG. 4 shows a representative grid-like pattern of an interlayer with dot-shaped zones.

Regular shapes include for example, circles, square, rectangles, ovals, triangles, and such other shapes, with an effective area generally greater than the thickness of the interlayer, in one embodiment. Irregular shapes include random shapes with closed boundaries, with effective area generally greater than the thickness of the interlayer in another embodiment. In one embodiment, the debonding zones are spaced adjacent one another. In another embodiment, the debonding zones are separated by interstitial space. In one embodiment, some debonding zones are spaced adjacent one another, and other debonding zones are separated by interstitial space. Other shapes include one-dimensionally oriented patterns such as gridlines, crisscross lines, lattice, interweave, random lines, concentric and eccentric circles, spaghetti patterns, flat strips, etc. FIG. 4 depicts a representative interlayer 14 having two zones, whereby dots are distributed in a grid-like pattern. Dots 100 are representative of the zones with a minimum mean peel adhesion and dots 200 are representative of the zones with a maximum mean peel adhesion. In one embodiment, a cluster of smaller shapes would form a zone, with a second cluster of smaller shapes that would form a second zone. In such embodiments, the aggregate peel strength of each cluster is measured, and the cluster of shapes is considered a debonding zone. The shapes within the cluster could be random shapes, regular, mixed regular shapes, mixed random shapes, or mixed random and regular shapes. The debonding zones as clusters could also comprise one-dimensionally oriented patterns such as gridlines, crisscross lines, random lines, concentric and eccentric circles, spaghetti patterns, flat strips, etc.

In case of gridlines, and such other one-dimensionally oriented shapes on the interlayer, the difference in peel strength between a gridline and the adjacent debonding zone may be measured by preparing a separate interlayer debonding zone with the strength of the gridline, and comparing it with the debonding zone on the interlayer of interest in between two gridlines, that is, in the interstitial spaces between two gridlines. Even in case of one-dimensionally oriented patterns, the area of such shapes may determine the peel-strength difference between a controlled debonding zone and the interstitial spaces or the difference between two adjacent controlled debonding zones.

The debonding zone is defined according to the peel adhesion strength. Stated another way, to a normal eye the interfacial region of the API may appear homogeneous and uniform, but for the purposes of the present invention, the debonding zones are defined by the difference in their peel strengths.

In one embodiment of the laminate structures described above, the weight content of the discrete zones, as a percentage of the total of the API including said discrete zones, is in the range of 1% to about 30%. Stated differently, the weight content is any one of the following numbers, as measured in percentage of the API: 1, 2, 3, 4, 5, 6, 7, 8, 9, 10, 11, 12, 13, 14, 15, 16, 17, 18, 19, 20, 21, 22, 23, 24, 25, 26, 27, 28, 29, and 30. The weight content can be any number within a range defined by any two numbers herein, including the endpoints of the range.

In one embodiment of the laminate structures described above, the weight content of the discrete zones, as a percentage of the total of the API including said discrete zones, is in the range of 0.00001% to about 30%. Stated differently, the weight content is any one of the following numbers, as measured in percentage of the API: 0.00001, 0.00002, 0.00005, 0.00008, 0.00010, 0.001, 0.005, 0.008, 0.010, 0.05, 0.1, 0.5, 1.0.

In another embodiment of the laminate structures described above, the weight content of the discrete debonding zones, as a percentage of the total of the API including said discrete debonding zones, is in the range of 0.001% to about 1%. Stated differently, the weight content is any one of the following numbers, as measured in percentage of the API: 0.001, 0.10, 0.020, 0.030, 0.040, 0.050, 0.060, 0.070, 0.080, 0.090, and 1.00. The weight content can be any number within a range defined by any two numbers herein, including the endpoints of the range.

In one embodiment, the separation between two discrete debonding zones is clearly demarcated. Stated another way, the difference in peel strength is sufficiently drastic to show a difference. In another embodiment, the difference between two zones is more diffuse. In one embodiment, there is a spatial distance between two discrete debonding zones of at least about 0.1 mm; or about 0.5 mm; or about 1.0 mm; or about 2.0 mm; or about 3.0 mm; or about 4.0 mm; or about 5.0 mm; or about 10.0 mm; or about 25.0 mm; or about 50.0 mm; or about 100.0 mm.

In one embodiment, the debonding zones' peel strengths are engendered by using different polymer or the same polymer to form the interlayer. In both cases, the present invention envisages the scenario where the molecular weight of the polymer is used to generate the debonding zones. In another embodiment, the thickness of the polymer interlayer is used to generate the debonding zones. In yet another embodiment, external treatment of the polymer interlayer is used to generate the debonding zones. In one embodiment, the debonding zones are generated by treatment of the interlayer polymeric adhesive and/or the laminate glass adhering to the polymeric interlayer. The debonding treatment can include the application of a chemically active substance or mixture which can alter the adhesive/debonding characteristics at or near the interface between the rigid substrate and the polymeric interlayer. A treatment can alternatively include the application of an energetic 'beam', such as electron beam, gamma, plasma, electron discharge, laser, ion-beam or other energetic means such as, plasma, flame-treatment, UV/VIS/IR radiation, microwaves or chemical alteration, via, coating techniques, chemical vapor deposition, and the like. Combinations of a chemical substance(s) with energetic sources can also be employed as a treatment. The treatment may be of an infinitesimally small dimension (i.e. only surface atomic or molecular monolayer affected by the treatment or the treatment may be of a finite thickness (approaching up to 10% (we need to decide on this number) of the interlayer thickness. The treatment may be applied to either the rigid substrate or to the polymeric interlayer or both. It is generally most advantageous to apply the treatment to the polymeric interlayer. The application directly to and as part of the interlayer provides for ease of the manufacturing (e.g. roll-to-roll processing and the like).

In one embodiment, a debonding zones are prepared by providing masks with specific patterns such that the curing light or curing effect reaches the surface of the interlayer in a fashion such that the adhesive tendencies image the mask. So, for example, in one embodiment, a masks with various patterns can be envisioned such that the desired debonding zone equivalents on the mask are covered in glass with different refractive indices or shapes (concave and convex, for example), so that the curing light reaches the interlayer surface in a frequency that generates specific adhesive patterns.

In an embodiment, the invention provides a polymeric interlayer comprising at least two zones, wherein the zone with maximum mean peel adhesion has a mean peel adhesion that is at least about 2 times greater than a mean peel adhesion of the zone with minimum mean peel adhesion; or about 3 times greater than a mean peel adhesion of the zone with minimum mean peel adhesion; or about 4 times greater than a mean peel adhesion of the zone with minimum mean peel adhesion; or about 5 times greater than a mean peel adhesion of the zone with minimum mean peel adhesion; or about 6 times greater than a mean peel adhesion of the zone with minimum mean peel adhesion; or about 7 times greater than a mean peel adhesion of the zone with minimum mean peel adhesion; or about 8 times greater than a mean peel adhesion of the zone with minimum mean peel adhesion; or about 9 times greater than a mean peel adhesion of the zone with minimum mean peel adhesion.

In an embodiment, the invention provides a polymeric interlayer comprising at least two zones, wherein the zone with maximum mean peel adhesion has a mean peel adhesion that is at least about 10, or at least about 15, or at least about 20, or at least about 25, or at least about 30, or at least about 35, or at least about 40, or at least about 45, or at least about 50, or at least about 55, or at least about 60, or at least about 65, or at least about 70, or at least about 75, or at least about 80, or at least about 85, or at least about 90, or at least about 95, or at least about 100, or at least about 105, or at least about 110, or at least about 115, or at least about 120, or at least about 125, or at least about 130, or at least about 135, or at least about 140, or at least about 145, or at least about 150, or at least about 155, or at least about 160, or at least about 165, or at least about 170, or at least about 175, or at least about 180, or at least about 185, or at least about 190, or at least about 195, or at least about 200, or at least about 205, or at least about 210, or at least about 215, or at least about 200, or at least about 225, or at least about 230, or at least about 235 times, or at least about 240, or at least about 245, or at least about 250, times greater than the minimum mean peel adhesion.

In an embodiment, the invention provides a polymeric interlayer comprising at least two zones, wherein the zone with maximum mean peel adhesion has a mean peel adhesion that is from about 2 times, or from about 3 times, or from about 4 times, or from about 5 times, or from about 10 times, or from about 15 times, of from about 20 times, or form about 25 times, or from about 30 times, or from about 35 times, or from about 40 times, or from about 45 times, or from about 50 times, to about 250 times, or to about 225 times, or to about 200 times, or to about 175 times, or to about 150 times, or to about 125 times, or to about 100 times, or to about 95 times, or to about 90 times, or to about 85 times, or to about 80 times, or to about 75 times, or to about 70 times, or to about 65 times, or to about 60 times, or to about 55 times, greater than the minimum mean peel adhesion.

In an embodiment, the invention provides a polymeric interlayer comprising at least two zones, wherein at least one of the zones has a mean peel adhesion of from about 0.1 kJ/m$^2$, or from about 0.25 kJ/m$^2$, or from about 0.5 kJ/m$^2$, or from about 0.75 kJ/m$^2$, or from about 1.0 kJ/m$^2$, or from 1.25 kJ/m$^2$, too about 4.0 kJ/m$^2$, or to about 3.5 kJ/m$^2$, or to about 3.0 kJ/m$^2$, or to about 2.5 kJ/m$^2$, or to about 2.0 kJ/m$^2$, or to about 1.5 kJ/m$^2$.

In yet another embodiment, the invention provides a polymeric interlayer comprising at least two zones, wherein at least one of the zones has a mean peel adhesion of from about 8.0 kJ/m$^2$, to about 8.5 kJ/m$^2$, or about 9.0 kJ/m$^2$, or about 9.5 kJ/m$^2$, to about 12.0 kJ/m$^2$, or to about 11.5 kJ/m$^2$, or to about 11.0 kJ/m$^2$, or to about 10.5 kJ/m$^2$.

In one embodiment comprising at least two zones, the mean peel adhesion of the zone with the maximum mean peel adhesion is in the range of from about 0.3 kJ/m$^2$ to about 12.0 kJ/m$^2$. Stated another way, the mean peel adhesion can be any one of the following numbers in kJ/m$^2$: 0.3, 0.4, 0.5, . . . , 1.0, 1.5, 2.0, . . . 3.0, 4.0, 5.0, 6.0, 7.0, 8.0, 9.0, 10.0, 11.0, and 12.0.

In one embodiment, such mean peel adhesion is within the range defined by selecting any two numbers above, including the end-points of such range.

In an embodiment, the invention provides a polymeric interlayer comprising at least two zones, wherein the zones are distributed in an ordered pattern. In an embodiment, the zones are distributed in a grid, in concentric circles or in a dot pattern. In another embodiment, the invention provides a polymeric interlayer comprising at least two zones, wherein the zones are distributed stochastically.

In another embodiment, the invention provides a polymeric interlayer comprising at least two zones, wherein one of the zones comprises a polyvinylacetal, and another of the zones comprises an ionomer.

In another embodiment, the invention provides a polymeric interlayer comprising at least two zones, wherein at least one of the zones comprises the ionomer and the ionomer is a sodium-neutralized ethylene-α,β-unsaturated carboxylic acid copolymer.

In another embodiment, the invention provides a polymeric interlayer comprising at least two zones, wherein at least one of the zones comprises the polyvinylacetal, and the polyvinylacetal is a polyvinylbutyral.

In yet another embodiment, the invention provides a polymeric interlayer comprising at least two zones, wherein the interlayer has a thickness of from about 0.1 mm to about 10.0 mm; or wherein the interlayer has a thickness of from about 0.25 mm to about 7.5 mm; or wherein the interlayer has a thickness of from about 0.35 mm to about 5.0 mm; or wherein the interlayer has a thickness of from about 0.5 mm to about 2.5 mm.

In yet another embodiment, the invention provides a polymeric interlayer comprising at least two zones, wherein the interlayer has a thickness of from about 0.1 mm to about 1.0 mm; or wherein the interlayer has a thickness of from about 1.0 mm to about 2.0 mm; or wherein the interlayer has a thickness of from about 2.0 mm to about 3.0 mm; or wherein the interlayer has a thickness of from about 3.0 mm to about 4.0 mm; or wherein the interlayer has a thickness of from about 4.0 mm to about 5.0 mm; or wherein the interlayer has a thickness of from about 5.0 mm to about 6.0 mm; or wherein the interlayer has a thickness of from about 6.0 mm to about 7.0 mm; or wherein the interlayer has a thickness of from about 7.0 mm to about 8.0 mm; or wherein the interlayer has a thickness of from about 8.0 mm to about 9.0 mm; or wherein the interlayer has a thickness of from about 9.0 mm to about 10.0 mm.

In a further embodiment, the invention provides a polymeric interlayer comprising at least two zones, wherein the interlayer is disposed between two panes of glass. In an embodiment, at least one of the glass panes is float glass. In an embodiment, both of the glass panes are float glass. In an embodiment, the interlayer is in contact with the tin side of the float glass.

In a further embodiment, the invention provides a polymeric interlayer comprising at least two zones, wherein at least one of the zones is shaped as a dot, a circle, a square, a rectangle, a pentagon, a hexagon; or is amorphous. In a further embodiment, the invention provides a polymeric interlayer comprising at least two zones, wherein the zones are each shaped as a dot, a circle, an oval, a triangle, a square, a rectangle, a pentagon, a hexagon; or is amorphous. In an embodiment, at least one of the zones are shaped as a dot. In an embodiment, at least one of the zones are shaped as a circle. In an embodiment, at least one of the zones are shaped as an oval. In an embodiment, at least one of the zones are shaped as a triangle. In an embodiment, at least one of the zones are shaped as a square. In an embodiment, at least one of the zones are shaped as a rectangle. In an embodiment, at least one of the zones are shaped as a pentagon. In an embodiment, at least one of the zones are shaped as a hexagon. In an embodiment, at least one of the zones are amorphous.

In a further embodiment, the invention provides a polymeric interlayer comprising at least two zones, wherein at least one of the zones is shaped as gridlines, crisscross lines, random lines, concentric circles, eccentric circles, spaghetti patterns and flat strips. In a further embodiment, the invention provides a polymeric interlayer comprising at least two zones, wherein the zones are each shaped as gridlines, crisscross lines, random lines, concentric circles, eccentric circles, spaghetti patterns and flat strips. In an embodiment, at least one of the zones are shaped as gridlines. In an embodiment, at least one of the zones are shaped as crisscross lines. In an embodiment, at least one of the zones are shaped as random lines. In an embodiment, at least one of the zones are shaped as concentric circles. In an embodiment, at least one of the zones are shaped as eccentric circles. In an embodiment, at least one of the zones are shaped as a spaghetti pattern. In an embodiment, at least one of the zones are shaped as a flat strip.

In a further embodiment, the invention provides a polymeric interlayer comprising at least two zones, wherein the zones have a size in a range of from about 0.5, or about 1.5, or about 2.0, or about 3.0, or about 4.0, or about 4.5, or about 5.0, times a thickness of the interlayer to about 10, or to about 9.0, or to about 8.0, or to about 7.0, or to about 6.0, or to about 5.5 times a thickness of the interlayer; or wherein the zones have a size that is about 5.0 times the thickness to of the interlayer.

In a further embodiment, the invention provides a polymeric interlayer comprising at least two zones, wherein the zones have a size in a range of from about 0.5 times a thickness of the interlayer to about 1.5 times the thickness of the interlayer; or wherein the zones have a size in a range of from about 1.5 times the thickness to about 2.0 times the thickness of the interlayer; or wherein the zones have a size in a range of from about 2.0 times the thickness to about 3.0 times the thickness of the interlayer; or wherein the zones have a size in a range of from about 3.0 times the thickness to about 4.0 times the thickness of the interlayer; or wherein the zones have a size in a range of from about 4.0 times the thickness to about 5.0 times the thickness of the interlayer; or wherein the zones have a size in a range of from about 5.0 times the thickness to about 6.0 times the thickness of the interlayer; or wherein the zones have a size in a range of from about 5.0 times the thickness to about 6.0 times the thickness of the interlayer; or wherein the zones have a size in a range of from about 6.0 times the thickness to about 7.0 times the thickness of the interlayer; or wherein the zones have a size in a range of from about 7.0 times the thickness to about 8.0 times the thickness of the interlayer; or wherein the zones have a size in a range of from about 8.0 times the thickness to about 9.0 times the thickness of the interlayer; or wherein the zones have a size in a range of from about 9.0 times the thickness to about 10.0 times the thickness of the interlayer.

In yet a further embodiment, the invention provides a polymeric interlayer comprising at least two zones, wherein the zones are shaped as a dot or circle having a diameter in the above-stated ranges.

In yet another embodiment, this invention relates to an adhesive polymeric interlayer (API) as described above, wherein an effective diameter of the discrete zone is in a range of from about 0.1 mm to about 50 mm. In one embodiment, the invention provides an API wherein an effective diameter of the discrete zone selected from one of the following numbers or is in a range defined by any two numbers including the endpoints of such range, as measured in mm: 0.1, 0.2, 0.3, 0.4, 0.5, 0.6, 0.7, 0.8, 0.9, 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, and 50.

In yet another embodiment, this invention relates to an adhesive polymeric interlayer (API) as described above, wherein the effective diameter of the regular shaped discrete zone, the random shaped discrete zone, or the cluster discrete zone is from about 1 multiple to about 150,000,000-multiples of the thickness of the discrete zone. An exemplary set of multiples includes the following numbers, those included within a range formed by any two numbers below: 1, 5, 10, 20, 100, 150, 200, 1000, 5000, 10000, 20000, 50000, 100000, 200000, 500000, 1000000, 5000000, 10000000, 20000000, 50000000, 100000000, 120000000, 125000000, and 150000000.

In one embodiment, the invention provides an interlayer that comprises discrete treated zones that have a surface area on one side that is a percentage number of the area of the substrate or the API surface where the percentage number is one of the following numbers, or is within a range defined by any two of the following numbers, including the endpoints of such range: 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 51, 52, 53, 54, 55, 56, 57, 58, 59, 60, 61, 62, 63, 64, 65, 66, 67, 68, 69, 70, 71, 72, 73, 74, 75, 76, 77, 78, 79, and 80.

In yet a further embodiment, the invention provides a polymeric interlayer comprising at least two sets of discrete zones, wherein one set of discrete zones, for example, the controlled debonding zones cover a surface area of: from about 1%, or from about 10%, or from about 20%, or from about 30%, to about 80%, or to about 60%, or to about 50%, or to about 40% of the surface areas of one of the glass substrate; from about 5% to about 25% of the surface areas of one of the glass substrate; from about 1% to about 35% of the surface areas of one of the glass substrate; from about 15% to about 55% of one of the glass panes; from about 25% to about 45% of one of the glass panes; from about 10% to about 15% of one of the glass panes; from about 15% to about 20% of one of the glass panes; from about 20% to about 25% of one of the glass panes; from about 25% to about 30% of one of the glass panes; from about 30% to about 35% of one of the glass panes; from about 35% to about 40% of one of the glass panes; from about 40% to about 45% of one of the glass panes; from about 45% to about 50% of one of the glass panes; from about 50% to about 55% of one of the glass panes; or from about 55% to about 60% of one of the glass panes.

In one embodiment, this invention envisions the same area coverage or a different area coverage between a first glass substrate and the corresponding API surface and a second glass substrate and the corresponding API surface, for example in a glass substrate 1/API/glass substrate 2 laminate.

In one embodiment, this invention also envisions stacks of laminates. So, for example if glass substrate was designated as "A" and the API was designated as "B", the following laminates are envisioned herein: A1/B1; A1/B1/A2; A1/B1/A2/B2/A3; A1/B1/A2/B2/B3/A3 . . . ; and A1/B1B2B3/A2/B4/A3; and so on and so forth. At least one of the API layers in such a stack of the invention comprises the discrete zones as described herein.

The above can be represented by a general formula:

$(A_xB_yA_w)_z$:

wherein y, $1 \leq y \leq 90$;
wherein z, $1 \leq z \leq 30$; and
wherein x=1, and w=1; or x=0 and w=1; or x=1 and w=0.

In other words, an $A_0$ means the substrate does not present in that arrangement at that spot in a stack.

In one embodiment, this invention envisions another protective layer, for example, an abrasion-resistance coated polyester. While this invention has been described with a focus on a rigid substrate (e.g. glass), in some cases a coated polyester, polycarbonate, nylon, and other polymeric substrates are also included.

In one embodiment of the invention, thinner interlayers are plied together to make a thicker interlayer.

In yet a further embodiment, the invention provides a polymeric interlayer comprising at least two zones, wherein one of the zones covers a surface area of from about 1% to about 35% of one of the glass panes; or wherein one of the zones covers a surface area of from about 5% to about 30% of one of the glass panes; or wherein one of the zones covers a surface area of from about 5% to about 25% of one of the glass panes; or wherein one of the zones covers a surface area of from about 10% to about 20% of one of the glass panes.

In yet a further embodiment, the invention provides a polymeric interlayer comprising at least two zones, wherein one of the zones covers a surface area of from about 1% to about 5% of one of the glass panes; or wherein one of the zones covers a surface area of from about 5% to about 10% of one of the glass panes; or wherein one of the zones covers a surface area of from about 10% to about 15% of one of the glass panes; or wherein one of the zones covers a surface area of from about 15% to about 20% of one of the glass panes; or wherein one of the zones covers a surface area of from about 20% to about 25% of one of the glass panes; or wherein one of the zones covers a surface area of from about 25% to about 30% of one of the glass panes; or wherein one of the zones covers a surface area of from about 30% to about 35% of one of the glass panes.

In yet another embodiment, the invention provides a polymeric interlayer comprising the number of zones per $cm^2$ in the range 0.04 to 10,000 including the endpoints of the range. Elaborating further, for example, in one embodiment, the number of zones per $cm^2$ include any one of the following numbers and any number within a range defined by any two numbers below, including the endpoints: 0.04, 0.05, 0.06, 0.07, 0.08, 0.09, 0.1, 0.5, 0.8, 1.0, 10, 20, 50, 100, 200, 500, 1000, 2000, 3000, 4000, 5000, 6000, 7000, 8000, 9000, and 10000.

In one embodiment, the number of zones described above are measured per $cm^2$, per $inch^2$, per $ft^2$, and per $m^2$.

In another embodiment, the invention provides a polymeric interlayer comprising three zones; or wherein the interlayer comprises at least four zones; or wherein the interlayer comprises at least five zones; or wherein the interlayer comprises at least six zones; or wherein the interlayer comprises at least seven zones; or wherein the interlayer comprises at least eight zones; or wherein the interlayer comprises at least nine zones; or wherein the interlayer comprises at least ten zones.

In an embodiment, the invention provides a laminate comprising the polymeric interlayer described herein. In an embodiment, the laminate comprises wood, plastic or glass.

In an embodiment, the laminate comprises wood. In an embodiment, the laminate comprises plastic. In an embodiment, the laminate comprises glass.

The invention will be further understood from the following specific examples of the properties of the laminated glass. However, it will be understood that these examples are not to be construed as limiting the scope of the present invention in any manner.

Test Methods

Adhesion

Adhesion is a key requirement for laminated glass. A standard peel test method was used to characterize adhesion in the samples described.

Laminates were prepared for adhesion tests following the approaches described with two important modifications. First, a 25.4 mm wide strip of a thin polyester release tape (25 mm×25 mm) was applied to one edge of one piece of glass prior to assembly of the glass and polymer components. This tape only lightly adhered to the glass and enabled a strip of polymer to be gripped by the peel-testing fixture. Secondly, a thin release film (Teflon®13 mm) was placed between the polymer and one of the glass pieces. This allowed the removal of one piece of glass so that a strip of polymer can be peeled off one of the glass pieces. Prior to peel testing, a 40 mm wide strip of polymer was separated from the adjacent polymer by cutting two channels using a sharp knife. Care was taken to make sure the channels were deep enough to fully cut through the polymer and detach it from adjacent material.

A peel configuration of 90 degrees was used and run with an extension rate of 0.18 mm/s at 23° C. and 50% RH. An MTS Criterion M45 universal testing machine, with a 1 kN load cell operating in displacement control mode was used for the measurements. The force-displacement characteristics were recorded at a frequency of 1 Hz. Five samples were tested for each adhesion treatment and the peel force was recorded as a function of extension.

FIG. 1 shows a typical peel measurement. With uniform adhesion control methods, a steady-state peel force was attained after an interfacial crack initiated. The peel force demonstrated small fluctuations. The energy to create unit area of interface is defined as the peel energy, G, and for the 90-degree peel geometry is given by:

$$\Gamma = \frac{P}{w}$$

Here, P is the peel force and w is the peel arm width. Using units of Newtons and mm, this yields a peel energy in units of $kJ/m^2$. The mean peel energy was determined by fitting a horizontal line to the steady-state peel force response.

Penetration Resistance

Penetration resistance of glass laminates was determined using a 2.27 kg (5 lb.) ball-drop test where a mean break height (MBH) was measured via a staircase method. MBH is defined as the ball-drop height at which 50% of samples would hold the ball and 50% would allow penetration. Automotive windshields for vehicle use in the United States, for example, must pass a minimum penetration resistance as found in the ANSI Z26.1 code. The staircase method uses an impact tower from which the steel ball is dropped from various heights on to a laminated glass sample. The sample is supported horizontally on four sides using a frame similar to that described in the ANSI Z26.1 code.

Laminated glass samples, construction: 1.9 mm annealed glass|0.9 mm Interlayer|1.9 mm annealed glass, were conditioned at a test temperature of 23° C. for 24 hours before testing. The test was performed by dropping the ball on to a supported sample from a height starting at 2 m. If the ball did not penetrate, and was supported for 30 seconds, this was recorded as a "pass." Subsequently, the ball drop height was increased by 0.5 m and the test repeated using a new laminated glass sample. When the ball penetrated the sample, this was recorded as a "failure," and the drop height was reduced by 0.5 m. After a pass, the drop height was increased by 0.5 m, after failure, the drop height was decreased by 0.5 m. This sequence of testing was continued until all samples were impacted. Results were tabulated and graphed then analyzed following the Bruceton method (J. W. Dixon and A. M. Mood (1948), "A Method for Obtaining and Analyzing Sensitivity Data," Journal of the American Statistical Association, 43, pp. 109-126), hence yielding the MBH.

Durability: Glass Retention During Thermal Cycling of Impacted Laminates

Glass retention after laminate breakage is an important performance requirement of laminated safety glass. In order to evaluate the durability of a laminate in the post-glass breakage state, laminates that had been tested in the ball drop MBH test were subsequently subjected to thermal cycling. Broken samples that had been penetrated by a 2.27 kg (5 lb.) steel ball dropped from a height of 5 m were chosen for thermal cycling. Since it is known that water affects adhesion and that freeze-thaw events are particularly deleterious, broken laminates were subjected to the following thermal cycling test protocol.

Starting at room temperature (23° C.), ramp (2° C./minute) to −40° C. (1 hour hold), ramp (2° C./minute) to 50° C. (1 hour hold), ramp (2° C./minute) to 23° C. One cycle takes 3.5 hours. The chamber humidity was maintained at 80% RH when the temperature was above 10° C. Note that moisture condensed on the laminate surface during cooling and ice was observed to form, especially on the laminate edges, when cycling below zero centigrade.

The cycle was repeated up to 100 times and the sample weight loss recorded at selected intervals. Sample weight loss resulted from detachment of glass fragments from the broken laminate during thermal cycling.

Controlled Debonding Zone Treatment—Mixed Mode Fracture (I): Mixed Adhesive Path In one embodiment, this invention relates to a preparing API layers and their laminate structures with rigid substrates (or flexible substrates) such as glass, wherein a substantial portion of the likely fracture can be restricted to a particular loci, for example, within the glass-API interface, within a treatment zone, or at the interface of the treatment and the API, or at the interface of the glass and the treatment, or within the API, or a combination thereof.

While the locus of the fracture can be controlled by providing a particular controlled debonding zone treatment, as described herein, it is also found that the fracture will be a mixed mode fracture, generally, in a mixed adhesive path.

Figure 5:
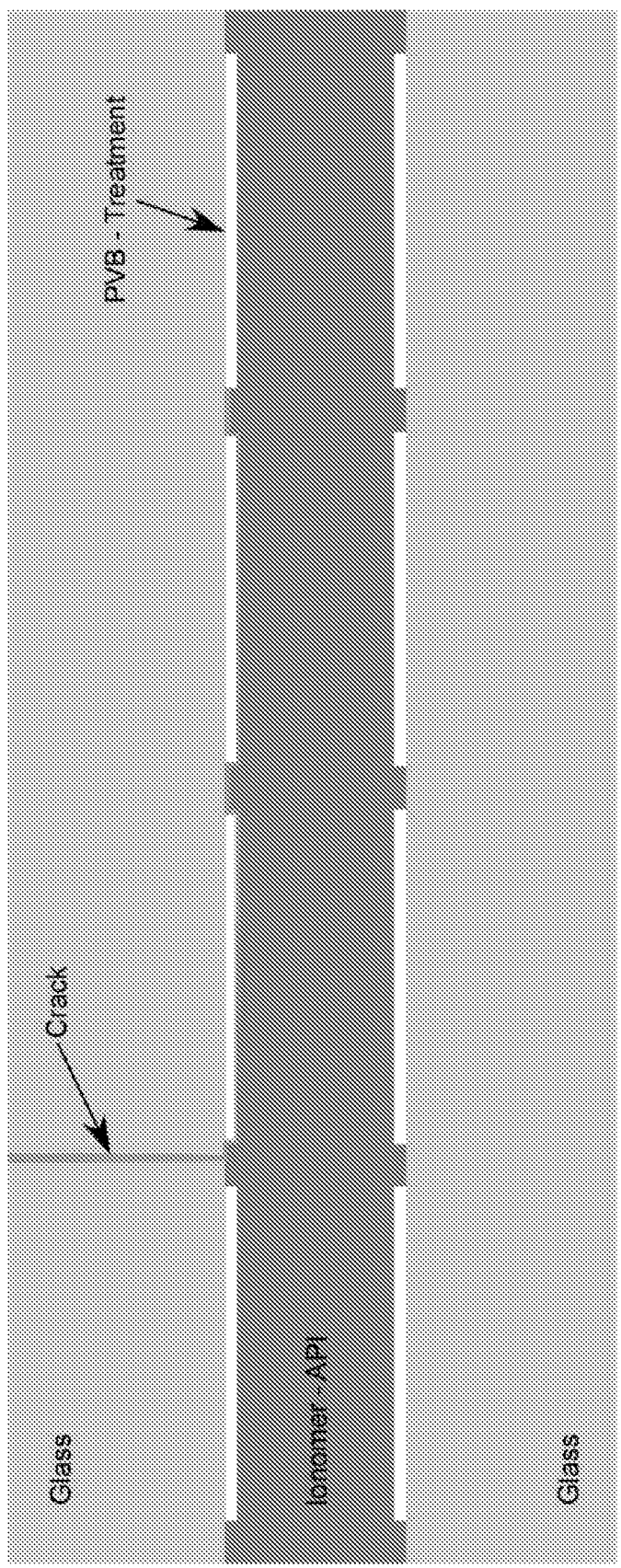
FIG. 5 shows a schematic of embodiment (I) (not to scale), with a locus of fracture (hypothetical crack) along glass-API interface (adhesive) and treatment-API interface (adhesive).

In this embodiment, the debonding initiates at the glass-API interface then primarily follows the interface between the API and treatment zone as dictated by the treatment zone geometry. The treatment geometry and crack paths are shown schematically in FIG. 5. In this sense, separation is a mixture of glass-API adhesive fracture and API-treatment adhesive fracture. For the example shown here, the bulk of the separation (approximately 80% of the separation area) is at the interfaces between the polymer phases (API and PVB treatment). The remaining component of the separation is at the API-Glass interface, again as dictated by the treatment geometry and layout pattern.

For this to occur, the following conditions should be met:

$$G_{T-API} \leq G_{glass-API} \leq G_{T-glass} < G_{0-T} \leq G_{0-API}$$

where:
$G_{T-API}$=Adhesive strength of the treatment-API interface (weakest interface)
$G_{glass-API}$=Adhesive strength of the glass-API interface (API adheres well to glass)
$G_{T-glass}$=Adhesive strength of the treatment-glass interface (treatment adheres well to glass)
$G_{0-T}$=Cohesive strength of the treatment (tough phase)
$G_{0-API}$=Cohesive strength of the API (tough phase)

Strictly speaking, these inequalities are only exact if the moduli of the API and the treatment are the same. Modulus mismatch complicates the fracture mechanics, but we will ignore this complication for now.

Example (I)—PVB Treatments on Ionomer

In this example, glass-polymer adhesion has been studied on laminates fabricated from annealed float glass and an ionomer interlayer sold by Kuraray America, Inc. (Wilmington, DE, USA) under the trademark "SENTRYGLAS®." The ionomer is a partially neutralized ethylene acid dipolymer ionomer obtained from The Dow Company, Midland, MI (21.7% methacrylic acid, Na 26% neutralized, MI=1.8 @190° C.).

Figure 2:
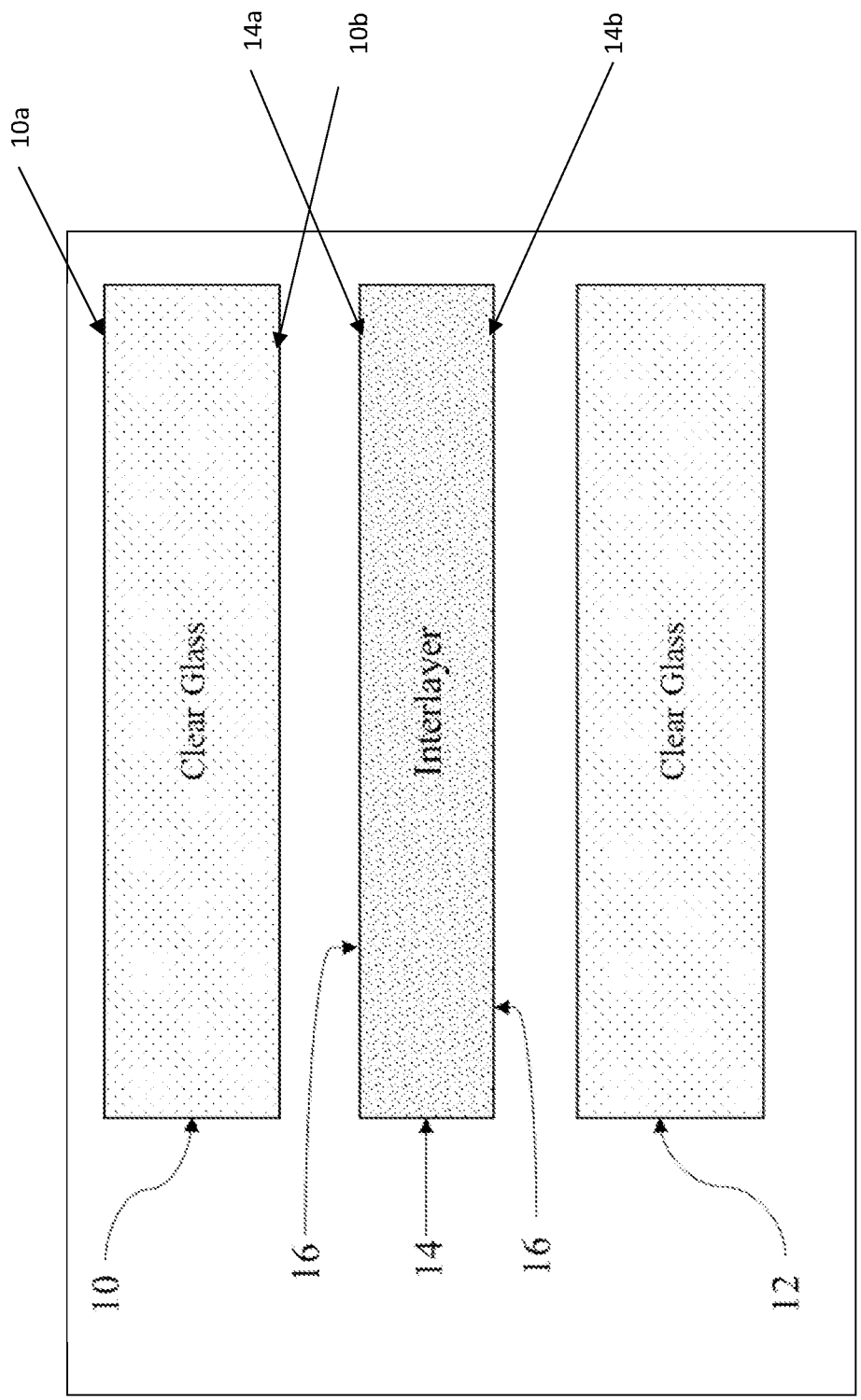
FIG. 2 shows a conventional arrangement of top glass lite 10, interlayer 14, and bottom glass lite 12. Interlayer surfaces 16 are typically imparted with a surface roughness or embossed texture to allow for deairing during laminate processing. 14a is a first interlayer surface, 14b is a second interlayer surface, 10a is a first glass surface and 10b is a second glass surface. A glass/interlayer interface occurs between first interlayer surface 14a and second glass surface 10b. If two layers of glass are used, then two interfaces are created. In the conventional art, the composition of the surface of the interlayer is essentially the same as the bulk interlayer composition, i.e., there is no attempt to alter its makeup for tailoring interaction with fusion with the glass surface in the formation of the laminated article.
Figure 3:
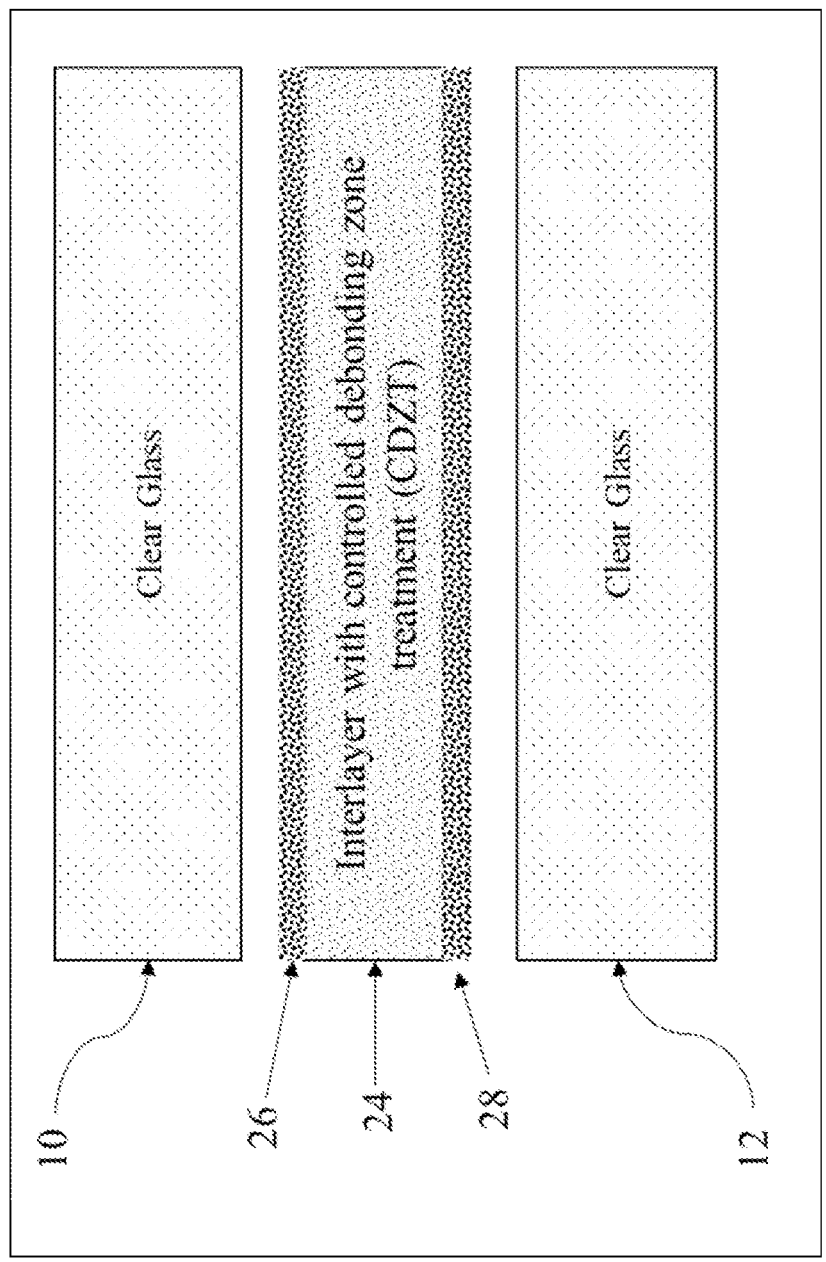
FIG. 3 shows a general cross-sectional diagram of a controlled debonding zone treatment. The treatment may be applied to the rigid substrate surface or be applied or be positioned at or near the surface of the polymeric interlayer, or both.

Debonding zones were created by combining 2 PVB thin films with the ionomer. The PVB used for the film contained no plasticizer, and was extruded using a single screw extruder with a maximum barrel temperature of 207° C. to a thickness of approximately 36 microns. Circular holes, 5 mm diameter, were cut into some the PVB films on a 10 mm×10 mm uniform square grid pattern using a laser-cutter (BOSSLASER, Model LS-1416 608 Trestle Point, Sanford FL 32771). In the example, the PVB films were positioned on the two outer surfaces of the ionomer API (surfaces 14a and 14b, FIG. 2) prior to lamination (see FIG. 3).

The glass used in the Examples was soda-lime glass; standard annealed (obtained from Guardian Industries, Inc., Galax VA, USA). Float glass is manufactured by floating the molten soda-lime-silica melt on a bath of molten metallic tin. The glass "tin" side is the glass that contacted the molten tin during manufacture and the glass "air" side is the opposite side that did not come into contact with the molten tin. Trace tin (Sn) impurities in the glass "tin" surface influence polymer-glass adhesion.

All glass was washed prior to fabrication of the laminates using soapy de-ionized water at 50° C. and rinsed thoroughly using de-ionized water. Generally, to produce soapy water, soap or detergent is added to water in an amount to form a lather when mixed.

Laminate Fabrication: A pre-press assembly, in which the ionomer API film, perforated PVB films (treatment) and glass were stacked in the desired order at room temperature, then placed into a disposable vacuum bag and held for 60 minutes under a vacuum of 25-30 inches of water to remove any air contained between the layers of the pre-press assembly. The pre-press assembly was loaded while still applying a vacuum to the bag into an air autoclave. The samples and bags were heated to 135° C. under an applied hydrostatic air pressure of 0.7 MPa. The vacuum to the bag was removed after reaching 135° C. and the laminates were held for 90 minutes in an air autoclave at an applied hydrostatic pressure of 0.7 MPa. The samples were then cooled at an approximate rate of 4° C./minute under constant pressure. After approximately 25 minutes of cooling, when the air temperature was less than about 50° C., the excess pressure was vented and the laminate was cooled to room temperature and removed from the autoclave. Under these laminate fabrication conditions, the ionomer API flowed to fill in the PVB holes and bonded to the glass. In addition, the PVB film bonded strongly to the glass and formed a transparent composite structure.

The process used in the example is similar to many standard industrial processes for the fabrication of laminated glass and resulted in materials with high clarity and minimal imperfections (bubbles etc.).

Figure 6:
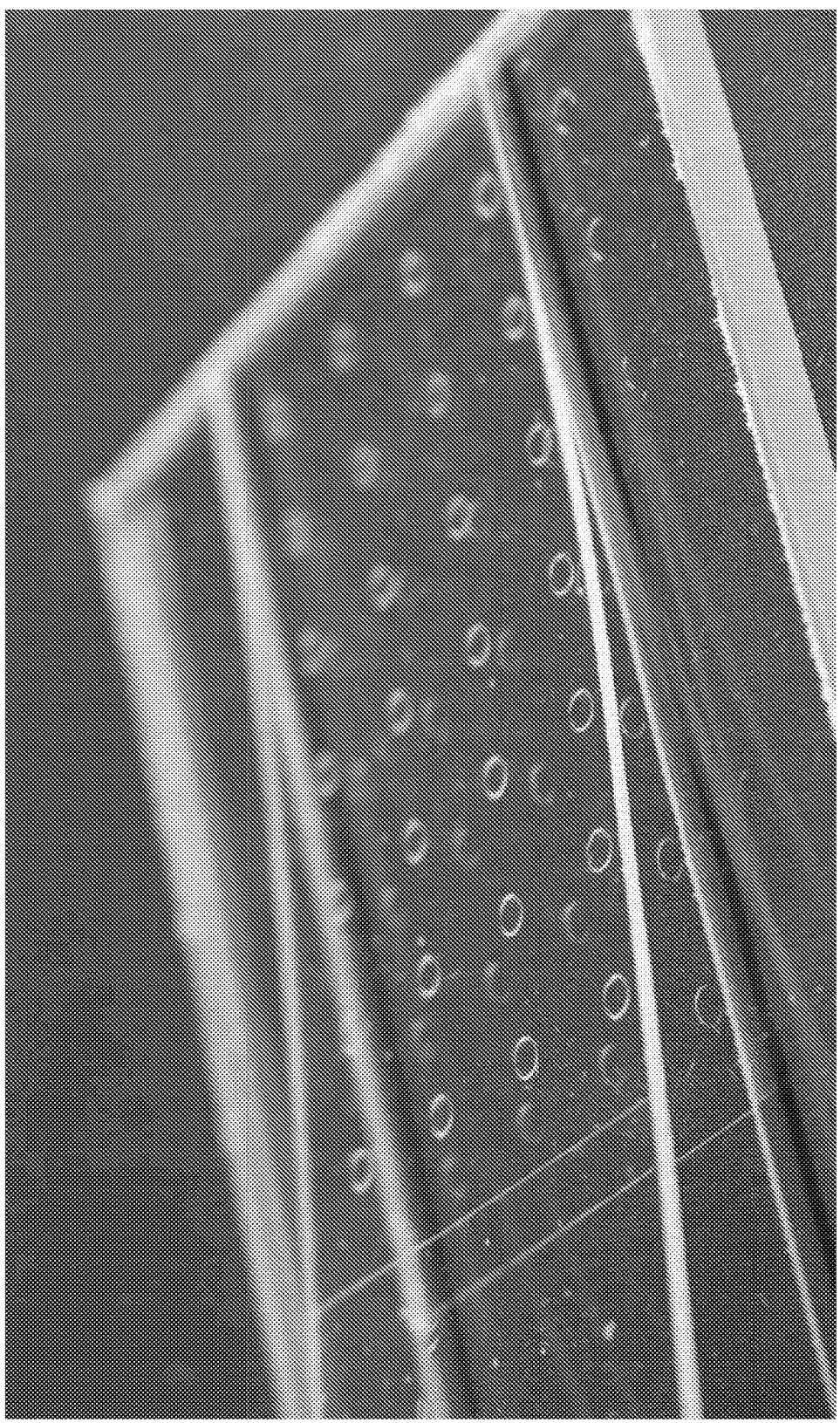
FIG. 6 shows a sample of embodiment (I) after peeling ionomer (API) from the glass. The PVB treatments remained strongly bonded to the glass. Most of the separation (fracture) of the API primarily was adhesive and occurred in the polymer phases at the API-Treatment (ionomer-PVB) interface. Ionomer-glass bonding zones (disc shaped) can be clearly seen.

FIG. 6 is a picture of a sample after running a peel test. The PVB treatments remained strongly bonded to the glass. Most of the separation (fracture) of the API primarily occurred in the polymer phases at the API-Treatment (ionomer-PVB) interface. Ionomer-glass bonding zones (disc shaped) can be clearly seen. The crack pack was seen to reside at the glass/API and PVB/API interfaces and in this sense, glass polymer separation comprised of mixed adhesive separation mode.

Figure 7:
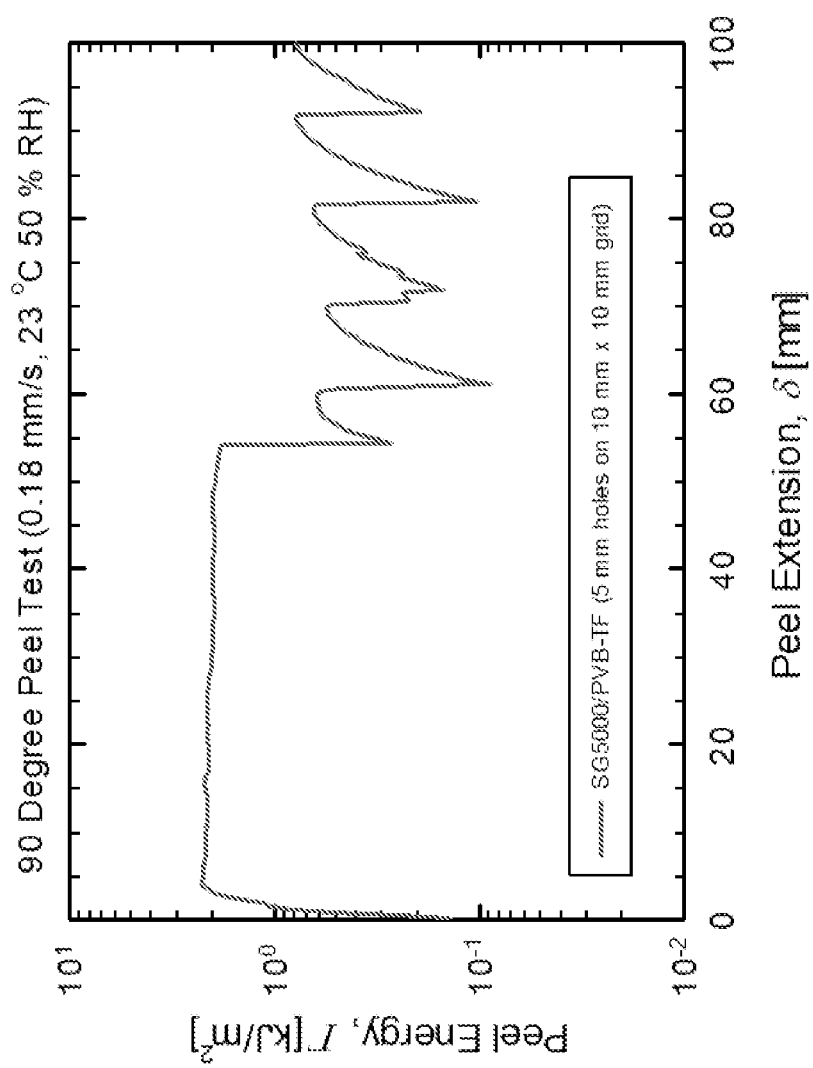
FIG. 7 shows a peel strength response for sample shown in FIG. 6.

FIG. 7 shows the peel strength characteristics of the sample described heretofore. The energy to peel the API initially occurred at a constant level in the untreated region of the API (ionomer). When the interface crack extended into the PVB (treated) region, the peel strength was seen to oscillate and be strongly modulated by the API/PVB structure.

Controlled Debonding Zone Treatment—Mixed Mode Fracture (II): Adhesive/Cohesive Path In another embodiment, this invention relates to a preparing API layers and their laminate structures with rigid substrates (or flexible substrates) such as glass, wherein a substantial portion of the likely fracture can be restricted to a particular loci, for example, within the glass-API interface, within a treatment zone, or at the interface of the treatment and the API, or at the interface of the glass and the treatment, or within the API, or a combination thereof.

While the locus of the fracture can be controlled by providing a particular controlled debonding zone treatment, as described herein, it is also found that the fracture will be a mixed mode fracture, generally.

Figure 8:
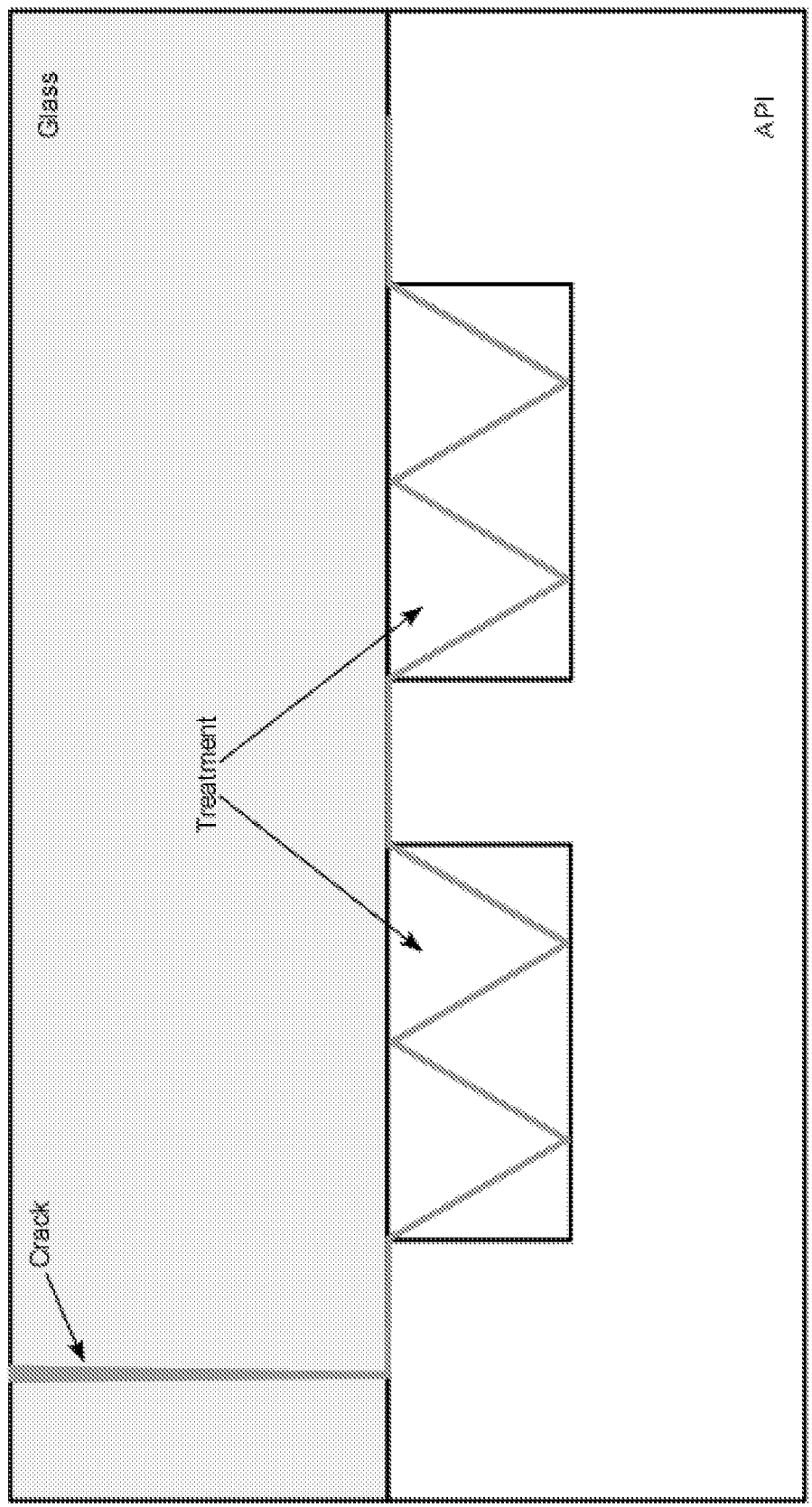
FIG. 8 shows a schematic of embodiment (II) (not to scale), with a locus of fracture (hypothetical crack) along glass-API interface (adhesive) and within the treatment (cohesive).

In this embodiment, the debonding initiates at the glass-API interface then deflects into the treatment zone. The crack path is mixed mode, residing partially at the glass-API interface and partially within the bulk of the treatment phase (schematically shown in FIG. 8).

Without wishing to be bound by theory, for the above to or this to occur the following conditions should be met:

$$GT - PI \le Gglass - 2D < G1D - \text{glass} \le G0 - T \le G0 - PI, \quad (I)$$

wherein:
GT-PI=adhesive strength of the first treatment-first polymeric material interface,
Gglass-2D=adhesive strength of the glass-second discreet zone interface (for example, one of the first polymeric material or first treatment adheres less to glass than the other),
G1D-glass=adhesive strength of the first discreet zone-glass interface (for example, the other of the first polymeric material or first treatment adheres better to glass than the other),
G0-T=cohesive strength of the first treatment, and
G0-PI=cohesive strength of the first polymeric material.

such that, on debonding of the glass and API, the separation of the glass and API predominantly comprises a mixture of glass-second discreet zone adhesive fracture and first polymeric material-first treatment adhesive fracture.

Strictly speaking, these inequalities are only exact if the moduli of the API and the treatment are the same. Modulus mismatch complicates the fracture mechanics, but we will ignore this complication for now.

Example (II)—PVB Treatments on Ionomer

In this example, glass-polymer adhesion, laminate penetration resistance and post-glass breakage durability have been studied on laminates fabricated from annealed float glass and an ionomer interlayer sold by Kuraray America, Inc. (Wilmington, DE, USA) under the trademark "SENTRYGLAS® XTRA™." The ionomer is a partially neutralized ethylene acid terpolymer ionomer obtained from The Dow Company, Midland, MI (21.7% methacrylic acid, 6.5% i-butyl acrylate, Na 25% neutralized, MI=3.8).

Debonding zone treatments were produced on the surface of the ionomer interlayer by spraying an aerosol solution comprising, 100-parts ethanol (95%)/water (5%), with 10-parts PVB (Mowital® B30H, Kuraray Europe GmbH) by weight. A mask made from a polyester film, containing 5 mm holes centered on a 10 mm×10 mm grid, was placed on the ionomer interlayer surface prior to application of the aerosol. On drying, a thin layer of PVB was precipitated on the ionomer API surface in a regular dot pattern. Approximately 5 mm diameter PVB treatment regions with nominal thickness of 10 to 15 microns were produced by this application method. In the example, an array of dots on a square grid, 10 mm×10 mm centers, was prepared on both ionomer API surfaces. The PVB treatment thus covered approximately 20% of each API surface.

The glass used in the Examples was soda-lime glass; standard annealed (obtained from Guardian Industries, Inc., Galax VA, USA). Float glass is manufactured by floating the molten soda-lime-silica melt on a bath of molten metallic tin. The glass "tin" side is the glass that contacted the molten tin during manufacture and the glass "air" side is the opposite side that did not come into contact with the molten tin. Trace tin (Sn) impurities in the glass "tin" surface influence polymer-glass adhesion.

All glass was washed prior to fabrication of the laminates using soapy de-ionized water at 50° C. and rinsed thoroughly using de-ionized water. Generally, to produce soapy water, soap or detergent is added to water in an amount to form a lather when mixed.

Laminate Fabrication: A pre-press assembly, in which the ionomer film with the PVB surface treatment and glass were stacked in the desired order at room temperature, then placed into a disposable vacuum bag and held for 60 minutes under a vacuum of 25-30 inches of water to remove any air contained between the layers of the pre-press assembly. The pre-press assembly was loaded while still applying a vacuum to the bag into an air autoclave. The samples and bags were heated to 135° C. under an applied hydrostatic air pressure of 0.7 MPa. The vacuum to the bag was removed after reaching 135° C. and the laminates were held for 90 minutes in an air autoclave at an applied hydrostatic pressure of 0.7 MPa. The samples were then cooled at an approximate rate of 4° C./minute under constant pressure. After approximately 25 minutes of cooling, when the air temperature was less than about 50° C., the excess pressure was vented, and the laminate was cooled to room temperature and removed from the autoclave. Under these laminate fabrication conditions, the ionomer interlayer and PVB treatment fused and adhered to the glass and produced a transparent laminate.

The process used in the examples is similar to many standard industrial processes for the fabrication of laminated glass and resulted in materials with high clarity and minimal imperfections (bubbles etc.).

Figure 9:
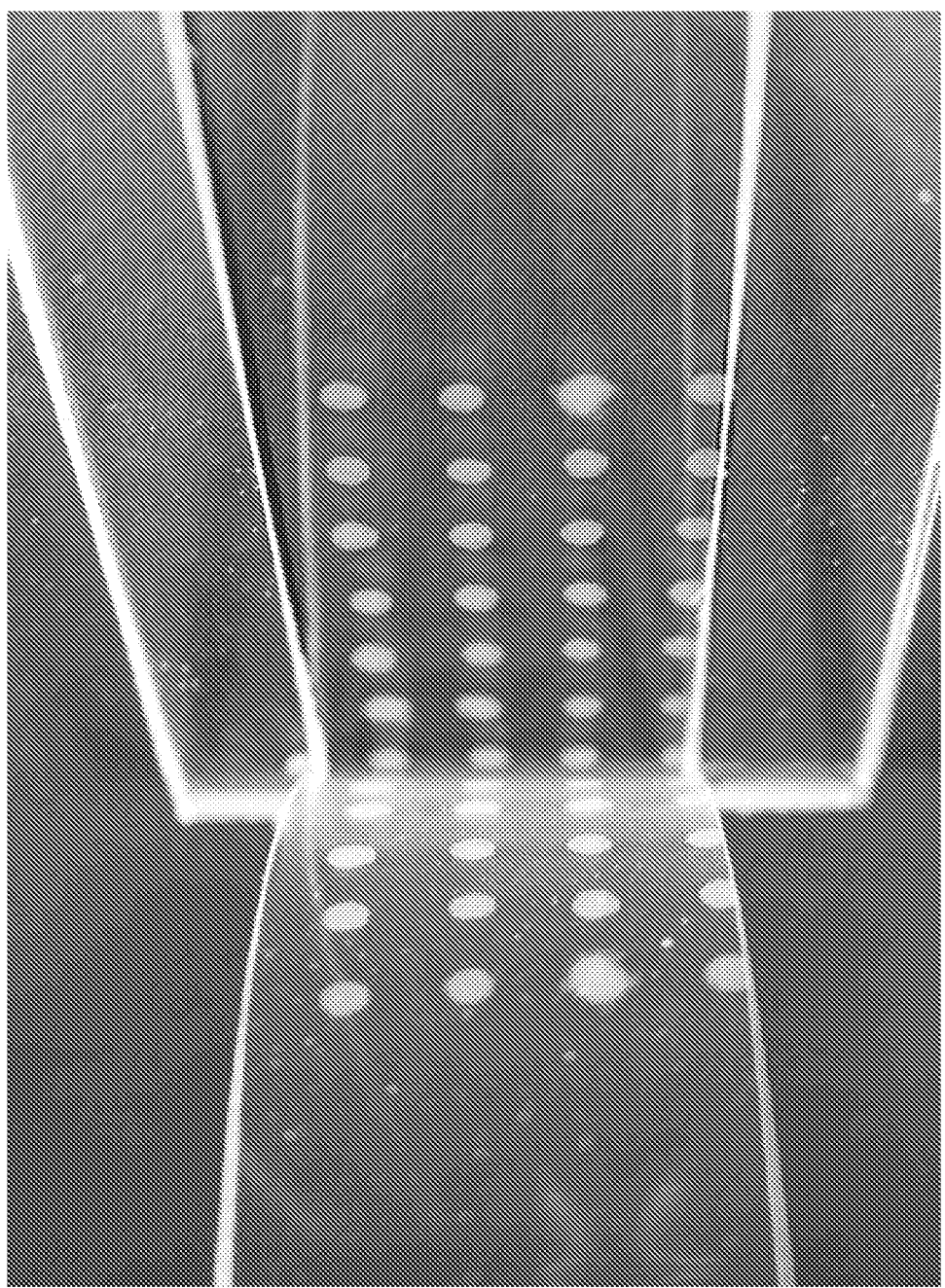
FIG. 9 shows a sample of embodiment (II) after peeling ionomer (API) from the glass. The PVB-treated regions became visible on both the API (adhesive) and glass surfaces (cohesive) after separation.
Figure 10:
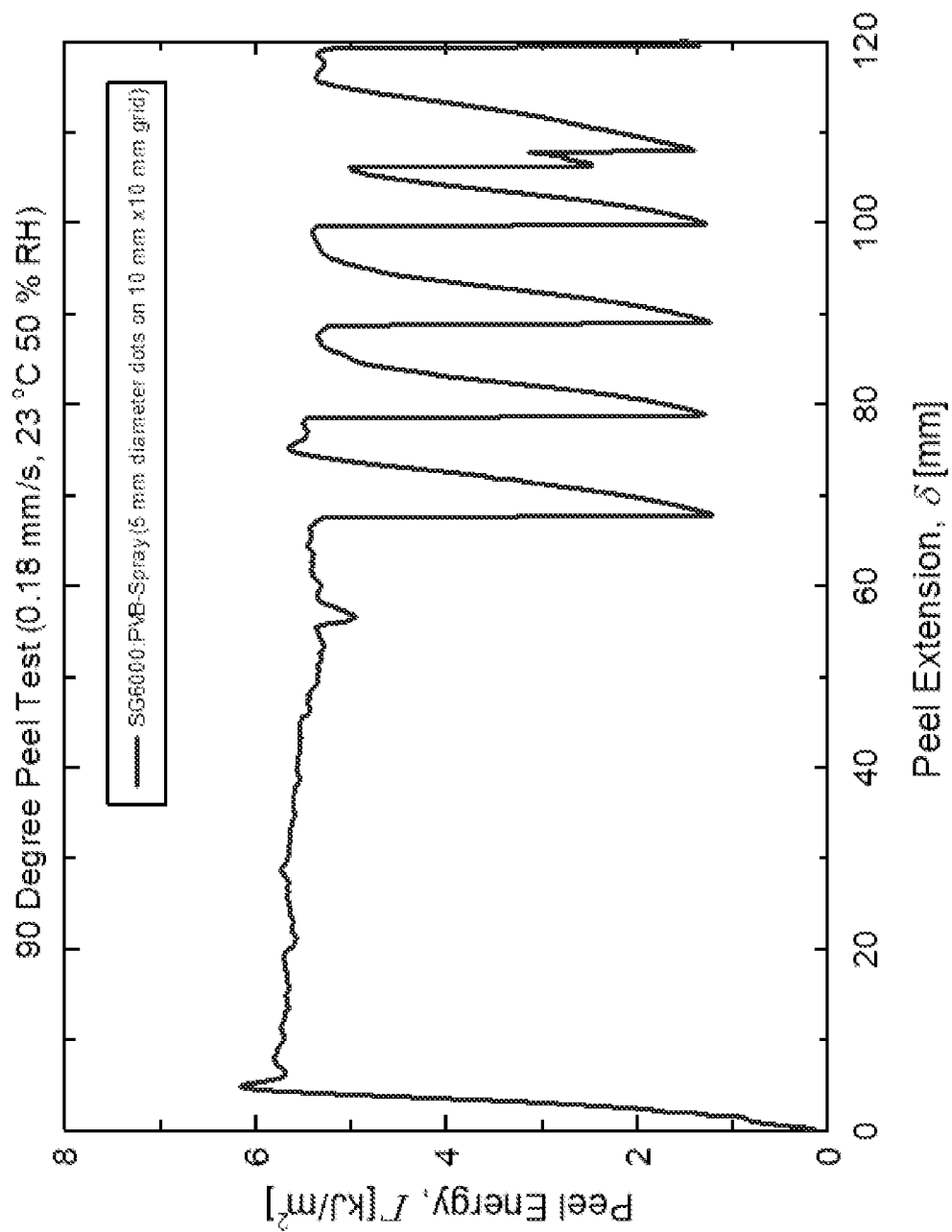
FIG. 10 shows a peel strength response for sample shown in FIG. 9.

The laminate peel strength (adhesion) was measured using the 90-degree peel test. After lamination, the sample was transparent, and the treated region could not be seen by the naked eye. FIG. 9 shows the peel sample after peeling the ionomer API from the glass. On peeling, the treated regions became visible. Residual PVB deposits can been seen on both the glass and API surfaces. The locus of failure initially was adhesive as the separation occurred primarily at the glass-API interface in the untreated region. As the interface crack ran into the treated region, the PVB dots ruptured cohesively thus leaving PVB deposits at both the glass-treatment interface and the ionomer-treatment interface. The fracture was mixed mode on a length scale that is similar to the treatment dimensions as shown schematically in FIG. 8. The measured peel response is shown in FIG. 10. As can be seen, the peel energy was readily modulated by such a treatment method.

Figure 11:
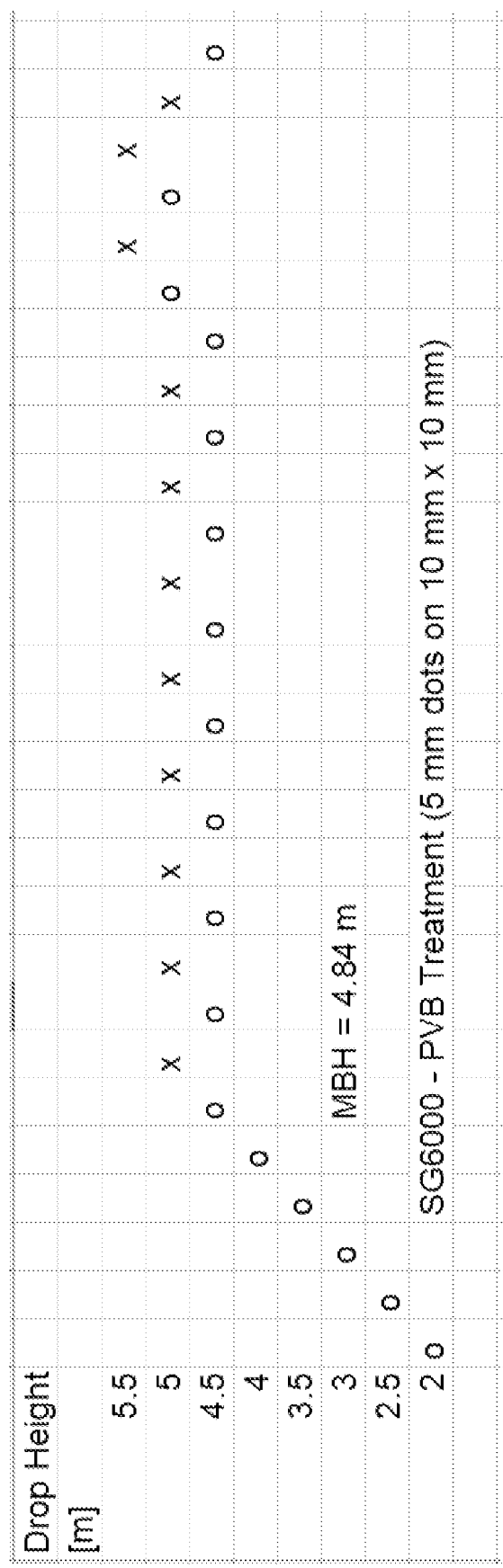
FIG. 11 shows raw ball-drop data for laminates made with the ionomer interlayer treated with the PVB surface treatment of Example (II).

Laminate penetration resistance was measured using a ball-drop method where the mean break height (MBH) was determined by the staircase method. FIG. 11 shows raw data for laminates made with the ionomer interlayer treated with the PVB surface treatment heretofore described. The MBH of the treated ionomer API laminate was 4.84 m. A control laminate using the same ionomer API, with no PVB surface treatment, demonstrated an MBH of 4.22 m. The PVB surface treatment thus resulted in an increased penetration resistance of 15%.

Laminate durability was evaluated by studying glass retention of broken laminated glass samples that had undergone 5 m ball drop test after thermal cycling. Table 1 summarizes the key observations.

TABLE 1

| API | Initial Sample Weight (g) | Sample Weight After 88 Cycles (g) | Weight Loss (%) |
| --- | --- | --- | --- |
| Ionomer (Control) | 955 | 951 | 0.4 |
| Ionomer - PVB Dot Treatment | 947 | 943 | 0.4 |

As can be seen, both the control glass laminates (untreated ionomer interlayer) and the glass laminates made with a PVB-treated ionomer API show good glass retention after thermal cycling. Note that both laminates were heavily damaged during the ball drop test. Despite extensive glass cracking and ball penetration, both samples demonstrated sufficient adhesion levels to minimize glass loss during aggressive thermal cycling.

Having now fully described this invention, it will be appreciated by those skilled in the art that the same can be performed within a wide range of equivalent parameters, concentrations, and conditions without departing from the spirit and scope of the invention and without undue experimentation.

The invention claimed is:

1. An adhesive polymeric interlayer (API), comprising:
a first and a second API surface;
a sheet of a first polymeric material having a first and a second surface, wherein the first polymeric material is an ionomer;
a first treatment in a discreet treatment zone geometry on the first surface of the first polymeric material to create a first treatment-first polymeric material interface;
a first discrete zone on the first API surface with a maximum mean peel adhesion; and
a second discrete zone on the first API surface with a minimum mean peel adhesion greater than about 0.01 kJ/m$^2$; and
wherein the maximum mean peel adhesion is at least about 2 times greater than the minimum mean peel adhesion;
wherein:
the first treatment is a polyvinyl acetal; and
when the first API surface is laminated to glass to create a glass-API interface, the resulting glass laminate meets one of the following two conditions:

$$G_{T-PI} \leq G_{glass-2D} < G_{1D-glass} \leq G_{0-T} \leq G_{0-PI}, \quad (I)$$

wherein:
$G_{T-PI}$=adhesive strength of the first treatment-first polymeric material interface,
$G_{glass-2D}$=adhesive strength of the glass-second discreet zone interface,
$G_{1D-glass}$=adhesive strength of the first discreet zone-glass interface,
$G_{0-T}$=cohesive strength of the first treatment, and
$G_{0-PI}$=cohesive strength of the first polymeric material,
such that, on debonding of the glass and API, the separation of the glass and API predominantly comprises a mixture of glass-second discreet zone adhesive fracture and first polymeric material-first treatment adhesive fracture;
or $$G_{0-T} \leq G_{glass-PI} < G_{T-PI} \leq G_{T-glass} < G_{0-PI} \quad (II)$$

wherein:
$G_{0-T}$=cohesive strength of the first treatment,
$G_{glass-PI}$=adhesive strength of the glass-first polymeric material interface,
$G_{T-PI}$=adhesive strength of the first treatment-first polymeric material interface,
$G_{T-glass}$=adhesive strength of the first treatment-glass interface, and
$G_{0-PI}$=cohesive strength of the first polymeric material,
such that, on debonding of the glass and API, the separation of the glass and API predominantly comprises a mixture of first treatment cohesive fracture and glass-first polymeric material adhesive fracture.

2. The adhesive polymer interlayer of claim 1, wherein one of the first or second discrete zones is distributed in an ordered pattern, or one of the first or second discreet zones is distributed stochastically.

3. The adhesive polymer interlayer of claim 1, wherein the discreet treatment zone geometry is characterized by:
(i) a regular plurality of substantially the same shape,
(ii) a stochastic plurality of substantially the same shape,
(iii) a regular plurality of random shapes,
(iv) a stochastic plurality of random shapes,
(v) a one-dimensional pattern,
(vi) a combination of two or more of (i)-(v), or
(vii) a cluster of one or more of (i)-(vi).

4. The adhesive polymer interlayer of claim 1, wherein a weight content of the first treatment as a percentage of a total weight of the API is in the range of from about 0.00001% to about 30%.

5. The adhesive polymer interlayer of claim 1, wherein the zone with maximum mean peel adhesion has a mean peel adhesion that is from about 2 times to about 250 times greater than a mean peel adhesion of the zone with minimum mean peel adhesion.

6. The adhesive polymer interlayer of claim 1, wherein at least one of the zones has a mean peel adhesion of from about 0.01 to about 12.0 KJ/m$^2$.

7. The adhesive polymer interlayer of claim 1, wherein the polyvinyl acetal is a polyvinyl butyral (PVB).

8. The adhesive polymer interlayer of claim 1, wherein the first discreet zone is a polyvinyl acetal, and the second discreet zone is an ionomer.

9. The adhesive polymer interlayer of claim 1, wherein the first discreet zone is an ionomer and the second discreet zone is a polyvinyl acetal.

10. A glass laminate comprising:
(i) a first glass substrate having a first and second glass surface; and
(ii) an adhesive polymeric interlayer (API) comprising a first and a second API surface;
wherein:
the second glass surface is adhered to the first API surface to create a glass/API interface;
the API comprises a sheet of a first polymeric material having a first and a second surface, wherein the first polymeric material is an ionomer;
a first treatment in a discreet treatment zone geometry on one or both of the first surface of the first polymeric material and second surface of the glass substrate, to create a first treatment-first polymeric material interface;
a first discrete zone at the glass/API interface with a maximum mean peel adhesion; and
a second discrete zone at the glass/API interface with a minimum mean peel adhesion greater than about 0.01 kJ/m$^2$;
wherein the maximum mean peel adhesion is at least about 2 times greater than the minimum mean peel adhesion; wherein:
the first treatment is a polyvinyl acetal; and
the glass laminate meets one of the following two conditions:

$$G_{T-PI} \leq G_{glass-2D} < G_{1D-glass} \leq G_{0-T} \leq G_{0-PI}, \quad (I)$$

wherein:
$G_{T-PI}$=adhesive strength of the first treatment-first polymeric material interface,
$G_{glass-2D}$=adhesive strength of the glass-second discreet zone interface,
$G_{1D-glass}$=adhesive strength of the first discreet zone-glass interface,
$G_{0-T}$=cohesive strength of the first treatment, and
$G_{0-PI}$=cohesive strength of the first polymeric material,
such that, on debonding of the glass and API, the separation of the glass and API predominantly comprises a mixture of glass-second discreet zone adhesive fracture and first polymeric material-first treatment adhesive fracture;
or $$G_{0-T} \leq G_{glass-PI} < G_{T-PI} \leq G_{T-glass} < G_{0-PI} \quad (II)$$

wherein:
$G_{0-T}$=cohesive strength of the first treatment,
$G_{glass-PI}$=adhesive strength of the glass-first polymeric material interface,
$G_{T-PI}$=adhesive strength of the first treatment-first polymeric material interface,
$G_{T-glass}$=adhesive strength of the first treatment-glass interface, and
$G_{0-PI}$=cohesive strength of the first polymeric material,
such that, on debonding of the glass and API, the separation of the glass and API predominantly comprises a mixture of first treatment cohesive fracture and glass-first polymeric material adhesive fracture.

11. The glass laminate of claim 10, wherein the first treatment is on the second surface of the glass.

12. The glass laminate of claim 10, wherein the first treatment is on the first surface of the API.

13. The glass laminate of claim 10, wherein the first treatment is a combination of both treatment on the first surface of the API and on the second surface of the glass.

* * * * *